US007010148B2

(12) United States Patent
Irving et al.

(10) Patent No.: US 7,010,148 B2
(45) Date of Patent: *Mar. 7, 2006

(54) CALIBRATION AND CORRECTION IN A FINGERPRINT SCANNER

(75) Inventors: Richard D. Irving, Palm Beach Gardens, FL (US); Walter Guy Scott, North Palm Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/690,641

(22) Filed: Oct. 23, 2003

(65) Prior Publication Data

US 2004/0156555 A1    Aug. 12, 2004

Related U.S. Application Data

(63) Continuation of application No. 09/425,947, filed on Oct. 25, 1999, now Pat. No. 6,658,164.

(60) Provisional application No. 60/147,498, filed on Aug. 9, 1999.

(51) Int. Cl.
  *G06K 9/00* (2006.01)
  *G06K 9/40* (2006.01)
(52) U.S. Cl. .................. 382/124; 382/169; 382/274
(58) Field of Classification Search ........ 382/167–169, 382/172, 274, 124; 358/406, 461
See application file for complete search history.

(56) References Cited

U.S. PATENT DOCUMENTS

| | | | |
|---|---|---|---|
| 2,500,017 A | 3/1950 | Altman | 88/57 |
| 3,200,701 A | 8/1965 | White | 88/14 |
| 3,482,498 A | 12/1969 | Becker | 95/12 |
| 3,527,535 A | 9/1970 | Monroe | 356/71 |
| 3,617,120 A | 11/1971 | Roka | 353/28 |
| 3,699,519 A * | 10/1972 | Campbell | 382/125 |
| 3,947,128 A | 3/1976 | Weinberger et al. | 356/71 |
| 3,968,476 A | 7/1976 | McMahon | 340/146.3 E |
| 4,032,975 A | 6/1977 | Malueg et al. | 358/213 |
| 4,063,226 A | 12/1977 | Kozma et al. | 365/125 |
| 4,210,899 A | 7/1980 | Swonger et al. | 340/146.3 E |
| 4,253,086 A | 2/1981 | Szwarcbier | |
| 4,414,684 A | 11/1983 | Blonder | 382/4 |
| 4,537,484 A | 8/1985 | Fowler et al. | 354/62 |
| 4,544,267 A | 10/1985 | Schiller | 356/71 |
| 4,601,195 A | 7/1986 | Garritano | 73/60 |

(Continued)

FOREIGN PATENT DOCUMENTS

EP    0 101 772 A1    3/1984

(Continued)

OTHER PUBLICATIONS

Btt (Biometric Technology Today), Finger technologies contacts, 2 pages.

(Continued)

*Primary Examiner*—Samir Ahmed
*Assistant Examiner*—Brian Le
(74) *Attorney, Agent, or Firm*—Sterne, Kessler, Goldstein & Fox, P.L.L.C.

(57) ABSTRACT

A calibration and correction procedure for a fingerprint scanner. The calibration and correction procedure performs an automatic calibration procedure and gray level linearity procedure. The automatic calibration procedure includes a brightness function to correct for distortions in brightness, a focus check function to identify when the fingerprint scanner is out of focus, and a geometric distortion function to correct for imperfect linearity in the geometry of the fingerprint scanner. The gray level linearity procedure corrects for linear distortions in brightness and contrast of gray levels.

21 Claims, 18 Drawing Sheets

U.S. PATENT DOCUMENTS

| | | | |
|---|---|---|---|
| 4,669,487 A | 6/1987 | Frieling | |
| 4,681,435 A | 7/1987 | Kubota et al. | 356/71 |
| 4,783,823 A | 11/1988 | Tasaki et al. | 382/4 |
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/52 |
| 4,876,726 A | 10/1989 | Capello et al. | 382/4 |
| 4,905,293 A | 2/1990 | Asai et al. | |
| 4,924,085 A | 5/1990 | Kato et al. | 250/227.28 |
| 4,933,976 A | 6/1990 | Fishbine et al. | 382/4 |
| 4,942,482 A | 7/1990 | Kakinuma et al. | |
| 4,995,086 A | 2/1991 | Lilley et al. | 382/4 |
| 5,054,090 A | 10/1991 | Knight et al. | 382/4 |
| 5,067,162 A | 11/1991 | Driscoll, Jr. et al. | 382/5 |
| 5,067,749 A | 11/1991 | Land | 283/117 |
| 5,131,038 A | 7/1992 | Puhl et al. | 380/23 |
| 5,146,102 A | 9/1992 | Higuchi et al. | 250/556 |
| 5,185,673 A * | 2/1993 | Sobol | 358/296 |
| 5,187,747 A | 2/1993 | Capello et al. | 382/4 |
| 5,222,152 A | 6/1993 | Fishbine et al. | 382/2 |
| 5,230,025 A | 7/1993 | Fishbine et al. | 382/4 |
| 5,233,404 A | 8/1993 | Lougheed et al. | 356/71 |
| 5,249,370 A | 10/1993 | Stanger et al. | 34/22 |
| 5,253,085 A | 10/1993 | Maruo et al. | |
| 5,291,318 A * | 3/1994 | Genovese | 359/17 |
| D348,445 S | 7/1994 | Fishbine et al. | D14/107 |
| D351,144 S | 10/1994 | Fishbine et al. | D14/107 |
| 5,363,318 A * | 11/1994 | McCauley | 702/85 |
| 5,384,621 A | 1/1995 | Hatch et al. | 355/204 |
| 5,412,463 A | 5/1995 | Sibbald et al. | 356/71 |
| 5,416,573 A | 5/1995 | Sartor, Jr. | 356/71 |
| 5,467,403 A | 11/1995 | Fishbine et al. | 382/116 |
| 5,469,506 A | 11/1995 | Berson et al. | 380/23 |
| 5,473,144 A | 12/1995 | Mathurin, Jr. | 235/380 |
| 5,483,601 A | 1/1996 | Faulkner | |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 380/23 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 395/309 |
| 5,650,842 A | 7/1997 | Maase et al. | 356/71 |
| 5,661,451 A | 8/1997 | Pollag | 340/426 |
| 5,680,205 A | 10/1997 | Borza | 356/71 |
| 5,689,529 A | 11/1997 | Johnson | 375/259 |
| 5,717,777 A | 2/1998 | Wong et al. | 382/124 |
| 5,745,684 A | 4/1998 | Oskouy et al. | 395/200.8 |
| 5,748,766 A | 5/1998 | Maase et al. | 382/124 |
| 5,748,768 A * | 5/1998 | Sivers et al. | 382/130 |
| 5,755,748 A | 5/1998 | Borza | 607/61 |
| 5,757,278 A | 5/1998 | Itsumi | |
| 5,767,989 A * | 6/1998 | Sakaguchi | 358/474 |
| 5,778,089 A | 7/1998 | Borza | 382/124 |
| 5,781,647 A | 7/1998 | Fishbine et al. | 382/1 |
| 5,793,218 A | 8/1998 | Oster et al. | 324/754 |
| 5,805,777 A | 9/1998 | Kuchta | 395/112 |
| 5,809,172 A * | 9/1998 | Melen | 382/232 |
| 5,812,067 A | 9/1998 | Bergholz et al. | 340/825.31 |
| 5,815,252 A | 9/1998 | Price-Francis | 356/71 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 395/309 |
| 5,848,231 A | 12/1998 | Teitelbaum et al. | 395/186 |
| 5,859,420 A | 1/1999 | Borza | 250/208.1 |
| 5,859,710 A | 1/1999 | Hannah | |
| 5,862,247 A | 1/1999 | Fisun et al. | 382/116 |
| 5,867,802 A | 2/1999 | Borza | 701/35 |
| 5,869,822 A | 2/1999 | Meadows, II et al. | 235/380 |
| 5,872,834 A | 2/1999 | Teitelbaum | 379/93.03 |
| 5,900,993 A | 5/1999 | Betensky | 359/710 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,928,347 A | 7/1999 | Jones | 710/129 |
| 5,960,100 A | 9/1999 | Hargrove | 382/124 |
| 5,960,125 A | 9/1999 | Michael et al. | |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,991,467 A | 11/1999 | Kamiko | |
| 5,995,014 A | 11/1999 | DiMaria | 340/825.31 |
| 6,018,739 A | 1/2000 | McCoy et al. | 707/102 |
| 6,023,522 A | 2/2000 | Draganoff et al. | 382/124 |
| 6,041,372 A | 3/2000 | Hart et al. | 710/62 |
| 6,055,071 A * | 4/2000 | Kuwata et al. | 358/501 |
| 6,064,753 A | 5/2000 | Bolle et al. | |
| 6,064,779 A | 5/2000 | Neukermans et al. | |
| 6,072,891 A | 6/2000 | Hamid et al. | |
| 6,075,876 A | 6/2000 | Draganoff | 382/124 |
| 6,078,265 A | 6/2000 | Bonder et al. | 340/825.31 |
| 6,088,585 A | 7/2000 | Schmitt et al. | 455/411 |
| 6,104,809 A | 8/2000 | Berson et al. | 380/23 |
| 6,122,394 A | 9/2000 | Neukermans et al. | |
| 6,137,893 A | 10/2000 | Michael et al. | |
| 6,178,255 B1 | 1/2001 | Scott et al. | |
| 6,195,447 B1 * | 2/2001 | Ross | 382/125 |
| 6,198,836 B1 | 3/2001 | Hauke | |
| 6,272,562 B1 | 8/2001 | Scott et al. | |
| 6,281,931 B1 * | 8/2001 | Tsao et al. | 348/247 |
| 6,327,047 B1 * | 12/2001 | Motamed | 358/1.15 |
| 6,347,163 B1 | 2/2002 | Roustaei | |

FOREIGN PATENT DOCUMENTS

| | | |
|---|---|---|
| EP | 0 308 162 A2 | 3/1989 |
| EP | 0 379 333 A1 | 7/1990 |
| EP | 0 623 890 A2 | 11/1994 |
| EP | 0 379 333 B1 | 7/1995 |
| EP | 0 889 432 A2 | 1/1999 |
| EP | 0 905 646 A1 | 3/1999 |
| EP | 0 924 656 A2 | 6/1999 |
| GB | 2 089 545 A | 6/1982 |
| GB | 2 313 441 A | 11/1997 |
| WO | WO 87/02491 | 4/1987 |
| WO | WO 90/03620 | 4/1990 |
| WO | WO 92/11608 | 7/1992 |
| WO | WO 94/22371 | 10/1994 |
| WO | WO 96/17480 | 6/1996 |
| WO | WO 97/29477 | 8/1997 |
| WO | WO 97/41528 A1 | 11/1997 |
| WO | WO 98/09246 A1 | 3/1998 |
| WO | WO 98/12670 | 3/1998 |
| WO | WO 99/12123 | 3/1999 |
| WO | WO 99/26187 A1 | 5/1999 |
| WO | WO 99/40535 | 8/1999 |

OTHER PUBLICATIONS

Drake, M.D. et al., "Waveguide hologram fingerprint entry device." *Optical Engineering,* vol. 35, No. 9, Sep. 1996, pp. 2499-2505.

Roethenbaugh, G. (ed.), *Biometrics Explained,* 1998, ICSA, pp. 1-34.

*Automated Identification Systems* (visited May 20, 1999) <http://www.trw.com/idsystems/bldgaccess2.html>, 1 page, Copyright 1999.
*Ultra-Scan Corporation Home Page* (visited May 20, 1999) <http://www.ultra-scan.com/index.htm>, 3 pages. (discusses technology as early as 1996).
*Profile* (last updated Aug. 16, 1998) <http://www.dermalog.de/Britain/Profile/profile.htm>, 3 pages. (discusses technology as early as 1990).
*ID-Card System Technical Specifications* (last updated Jul. 18, 1998) <http://dermalog.de/Britain/Products/ID-Card/idcard2.htm>, 2 pages.
*Fujitsu Limited Products and Services* (updated Apr. 21, 1999) <http://www.fujitsu.co.jp/hypertext/Products/index-e.html>, 3 pages, Copyright 1995-1999.
*SonyDCam* (visited May 20, 1999) <http://www.microsoft.com/DDK/ddkdocs/Win2k/sonydcam.htm>, 3 pages, Copyright 1999.
*Verid Fingerprint Verification* (visited May 17, 1999) <http://www.tssi.co.uk/products/finger.html>, 2 pages.
*Startek's Fingerprint Verification Products: Fingerguard FG-40* (visited May 18, 1999) <http://www.startek.com.tw/product/fg40/fg40.html>, 3 pages.
*SAC Technologies Showcases Stand-Alone SAC-Remote (TM)* (visited May 18, 1999) <http://www.pathfinder.com/money/latest/press/PW/1998Mar25/1026.html>, 2 pages.
"Biometrics, The Future Is Now," www.securitymagazine.com, May 1999, pp. 25-26.
*Mytec Technologies Gateway,* (visited Apr. 27, 1999) <http://www.mytec.com/Products/gateway/>, 1 page.
*Mytec Technologies Gateway: Features & Benefits,* (visited Apr. 27, 1999) <http://www.mytec.com/Products/gateway/features.htm>, 1 page.
*Mytec Technologies Touchstone Pro,* (visited Apr. 27, 1999) <http://www.mytec.com/Products/Touchstone/>, 1 page.
*Mytec Technologies Touchstone Pro: Features,* (visited Apr. 27, 1999) <http://www.mytec.com/Products/Touchstone/features.htm>, 1 page.
*Electronic Timeclock Systems and Biometric Readers* (last updated Apr. 17, 1999) <http://www.lfs-hr-bene.com/tclocks.html>, 1 page.
*Fingerprint Time Clock* (visited May 17, 1999) <http://www.lfs-hr-bene.com/Biometrics/Fingerprintclock.html>, 6 pages.
*KC-901: The KSI fingerprint sensor* (visited May 17, 1999) <http://www.kinetic.bc.ca/kc-901.html>, 3 pages.
*Intelnet Inc.* (visited May 20, 1999) <http://www.intelgate.com/index.html>, 1 page, Copyright 1996.
*Ver-i-Fus Fingerprint Access Control System* (visited May 20, 1999) <http://www.intelgate.com/verifus.htm>, 2 pages. (Ver-i-fus product released in 1995).
*Ver-i-fus® Configurations* (visited May 20, 1999) <http://www.intelgate.com/verconfig.html>, 1 page. (Ver-i-fus product released in 1995).
*Ver-i-Fus® & Ver-i-Fus$^{mil}$®* (visited May 20, 1999) <http://www.intelgate.com/vif_data.htm>, 3 pages. (Ver-i-fus product released in 1995).
*Access Control System Configurations* (visited May 20, 1999) <http://www.intelgate.com/access.htm>, 2 pages. (Ver-i-fus product released in 1995).
*Company* (visited May 17, 1999) <http://www.instainfo.com.company.htm>, 2 pages.
*TouchLock™ II Fingerprint Identity Verification Terminal* (visited May 17, 1999) <http://www.identix.com/TLock.htm>, 4 pages.
*Physical Security and Staff Tracking Solutions* (visited May 17, 1999) <http://www.identix.com/products/biosecurity.html>, 3 pages, Copyright 1996-1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand-Alone Fingerprint Verification Terminal* (visited Apr. 27, 1999) <http://www.biometricid.com/veriprint2100.htm>, 3 pages.
Randall, N., "A Serial Bus on Speed," *PC Magazine,* May 25, 1999, pp. 201-203.
*The DERMALOG Check-ID* (visited Nov. 12, 1999) <http://www.dermalog.de/ganzneu/products_check.html>, 1 page.
*Check-ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050/ff1050.html>, 3 pages.
Systems for Live-Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Identix Incorporated, 1 page, Copyright 1999.
Verid Fingerprint Reader, TSSI, 4 pages.
Response to Request for Information, Cross Match Technologies, Inc., 12 pages, Apr. 14, 1999.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4-en/empreinte-dig-en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live-Scan Products: Digital Biometrics TENPRINTER* (visited Nov. 17, 1999) <http://www.digitalbiometrics.com/products/tenprinter.htm>, 4 pages. (Tenprinter released in 1996).
*DBI Live-Scan Products: Networking Options* (visited Nov. 17, 1999) <http://www.digitalbiometrics.com/products/networking_options.htm>, 3 pages.
*DBI Live-Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live-Scan Products: Image Printer Stations* (visited Nov. 17, 1999) <http://www.digitalbiometrics.com/products/imageprinter.htm>, 2 pages.
*DBI Live-Scan Products: FC-21 Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra-scan.com/400.htm>, 3 pages (Scanner released in 1996).
*USC Scanner Design* (visited Nov. 17, 1999) <http://www.ultra-scan.com/scanner.htm>, 4 pages. (Scanner released in 1996).
*Series 500/600 Scanners* (visited Nov. 17, 1999) <http://www.ultra-scan.com/500.htm>, 3 pages. (Scanner released in 1996).
*Series 700 ID Station* (visited Nov. 17, 1999) <http://www.ultra-scan.com/700.htm>, 3 pages. (Scanner released in 1998).
*Identix: The Corporation* (visited Nov. 17, 1999) <http://www.identix.com/corporate/home.htm>, 2 pages, Copyright 1996-1998.
*Biometric Imaging Products* (visited Nov. 17, 1999) <http://www.identix.com/products/bioimage.htm>, 1 page, Copyright 1996-1998.
*TouchPrint™ 600 Live-Scan System* (visited Nov. 17, 1999) <http://www.identix.com/products/livescan.htm>, 4 pages, Copyright 1996-1998.
*TouchPrint™ 600 Palm Scanner* (visited Nov. 17, 1999) <http://www.identix.com/products/palmscan.htm>, 3 pages, Copyright 1996-1998.
*TouchPrint™ 600 Card Scan System* (visited Nov. 17, 1999) <http://www.identix.com/products/cardscan.htm>, 3 pages, Copyright 1996-1998.
*Dermalog Key—The safest and easiest way of access control* (Last updated Jul. 18, 1998) <http://www.dermalog.de/Britain/Products/Key/key.htm>, 1 page.
*Dermalog Finger-ID Your small size solution for high security* (Last updated Jul. 18, 1998) <http://www.dermalog.de/Britain/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main-FPB.html>, 1 page.
*Fingerprint Biometrics: Securing The Next Generation,* May 19, 1999, (visited Nov. 17, 1999) <http://www.secugen.com/pressre1.htm>, 2 pages.
*Secugen Unveils Fully Functional Fingerprint Recognition Solutions,* May 11, 1999, (visited Nov. 17, 1999) <http://www.secugen.com/pressre1.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999) <http://www.iosoftware.com/biosols/sony/fiu/applications/fit100.htm>, 2 pages.
*Sony Fingerprint Identification Unit (FIU-700)* (visited Nov. 17, 1999) <http://www.iosoftware.com/biosols/sony/fiu70/index.htm>, 2 pages. (Unit available late 1999).
*Sony Fingerprint Identification Unit* (visited Nov. 17, 1999) <http://www.iosoftware.com/biosols/sony/fiu/index.htm>, 3 pages.
*Fujitsu Fingerprint Recognition Device (FPI-550)* (visited Nov. 17, 1999) <http://www.iosoftware.com/biosols/fujitsu/fpi550.htm>, 2 pages.
*Mitsubishi MyPass LP-1002* (visited Nov. 17, 1999) <http://www.iosoftware.com/biosols/mitsubishi/mypass.htm>, 2 pages.
*SecureTouch PV—A Personal Password Vault* (visited Nov. 17, 1999) <http://www.biometricaccess.com/securetouch_pv.htm>, 1 page.

*Digital Descriptor Systems, Inc.—Profile* (visited Nov. 17, 1999) <http://www.ddsi-cpc.com/pages/profile.html>, 3 pages.
*Press Release: Printrak International Announces New Portable Fingerprint ID Solution,* Dec. 10, 1996, (visited Nov. 17, 1999) <http://www.scott.net/~dg/25.htm>, 3 pages.
*Corporate Profile* (visited Nov. 17, 1999) <http://www.printrakinternational.com/corporate.htm>, 1 page.
*Printrak Products* (visited Nov. 17, 1999) <http://www.printrakinternational.com/Products.htm>, 1 page. (Discusses technology as early as 1974).
Verifier™ 200 Fingerprint Capture Devices, Cross Match Technologies, Inc., 2 pages, 1996-1997.
Verifier 200 Direct Fingerprint Reader, Cross Check Corporation, 2 pages, 1996-1997.
Verifier™ 250 Fingerprint Capture Devices, Cross Match Technologies, Inc., 2 pages, 1996-1997.
Verifier 250 Small Footprint Direct Fingerprint Reader, Cross Check Corporation, 2 pages, 1996-1997.
Verifier™290 Fingerprint Capture Devices, Cross Match Technologies, Inc., 2 pages, 1996-1997.
Verifier 290 Direct Rolled Fingerprint Reader, Cross Check Corporation, 2 pages, 1996-1997.
Verifier™ 500 Fingerprint Capture Devices, Cross Match Technologies, Inc., 2 pages, 1998.
Biometric terminal, 1 page.
10-Print Imaging System, Cross Check Corporation, 2 pages, 1998.
*Cross Match Technologies, Inc.* (visited Mar. 25, 1999) <http://www.crossmatch.net/>, 1 page.
*Cross Match Technologies, Inc.—Products Overview* (visited Mar. 25, 1999) <http://www.crossmatch.net/new/products/product-index.html>, 1 page.
*Cross Match Technologies, Inc.—Law Enforcement Systems* (visited Mar. 25, 1999) <http://www.crossmatch.net/new/law/law-index.html>, 2 pages.
*Cross Match Technologies, Inc.—Commercial Systems: Building On The Standard* (visited Mar. 25, 1999) <http://www.crossmatch.net/new/commercial/commercial-index.html>, 2 pages.
*Cross Match Technologies, Inc.—International Sales* (visited Mar. 25, 1999) <http://www.crossmatch.net/new/sales/sales-index.html>, 1 page.
*Cross Match Technologies, Inc.—Support* (visited Mar. 25, 1999) <http://www.crossmatch.net/new/support/support-index.html>, 1 page.
*Cross Match Technologies, Inc.—News—Press Releases—Verifier 400 Press Release* (visited Mar. 25, 1999) <http://www.crossmatch.net/new/news/new-pr-050798.html>, 1 page.
*Global Security Fingerscan™ System Overview* (visited Jan. 11, 2000) <http://wwwu-net.com/mbp/sol/g/a9.htm>, 12 pages.
Peter Rockett, "BMVC99—The Accuracy of Sub-Pixel Localisation in the Canny Edge Detector," Department of Electronic & Electrical Engineering—University of Sheffield, 1999, pp. 392-401.
Peter Seitz, "Optical Super Resolution Using Solid-State Cameras and Digital Signal Processing," Optical Engineering, vol. 27, No. 7, Jul. 1988, pp. 535-540.
"Command Structure for a Low-cost (Primitive) Film Scanner," *IBM Technical Disclosure Bulletin,* vol. 35, No. 7, Dec. 1992, pp. 113-121.

*Fingerprint Scan API Toolkit Version 1.x Feature List* (Apr. 26, 2000) <http://www.mentalix.com/api/archive_fapiv1.htm>, 3 pages.

Kunzman, Adam J. and Wetzel, Alan T., "1394 High Performance Serial Bus: The Digital Interface for ATV," *IEEE Transaction on Consumer Electronics,* IEEE, vol. 41, No. 3, Aug. 1995, pp. 893-900.

*Mentalix Provides The First IAFIS-Certified Latent Print Scanning Solution For Windows* (Jul. 23, 1999) <http://www.mentalix.com/pressreleases/fprintlook3_prel.htm>, 2 pages.

Sluijs, F. et al., "An On-chip USB-powered Three-Phase Up/down DC/DC Converter in a Standard 3.3V CMOS Process," *2000 IEEE International Solid-State Circuits Conference,* IEEE, Feb. 9, 2000, pp. 440-441.

EPO Patent Abstract for Japanese Patent Publication No. 10-079017, published Mar. 24, 1998, 1 page.

EPO Patent Abstract for Japanese Patent Publication No. 10-262071, published Sep. 29, 1998, 1 page.

EPO Patent Abstract for Japanese Patent Publication No. 11-167630, published Jun. 22, 1999, 1 page.

EPO Patent Abstract for Japanese Patent Publication No. 11-252489, published Sep. 17, 1999, 1 page.

"Image Acquisition System," *IBM Technical Disclosure Bulletin,* vol. 29, No. 5, Oct. 1986, pp. 1928-1931.

Patent Abstracts of Japan, Publication No. 59103474, Published Jun. 14, 1984, 1 page.

Venot, Alain et al., "Automated Comparison of Scintigraphic Images," *The Journal of Nuclear Medicine,* vol. 27, No. 8, Aug. 1986, pp. 1337-1342.

*Remote Access Positive IDentification—raPID* (visited Jun. 3, 1998) <http://www.nec.com . . . >, 2 pages, Copyright 1997.

*Morpho DigiScan Cellular* (visited Jun. 3, 1998) <http://www.morpho.com/products/law_enforcement/digiscan/cellular.htm>, 2 pages, Copyright 1998.

*A.F.I.S.* (last updated Apr. 4, 1998) <http://www.dermalog.de/afis.htm>, 2 pages.

*Morpho FlexScan Workstation* (visited Jun. 3, 1998) <http://www.morpho.com/products/law_enforcement/flexscan/>, 2 pages, Copyright 1998.

*Time is Money!* (visited Jun. 5, 1998) <http://www.iaus.com/afim.htm>, 3 pages.

*LS 1 LiveScan Booking Workstation High Performance Finger & Palm Scanning System* (visited Jun. 4, 1998) <http://www.hbs-jena.com/ls1.htm>, 6 pages, Copyright 1998.

*Welcome to the Homepage of Heimann Biometric Systems GMBH* (visited Jun. 4, 1998) <http://www.hbs-jena.com/>, 1 page, Copyright 1998.

*Heimann Biometric Systems Corporate Overview* (visited Jun. 4, 1998) <http://www.hbs-jena.com/company.htm>, 4 pages, Copyright 1998.

True-ID® The LiveScan with special "ability" . . . , 2 pages.

*Printrak International: User List* (visited Jun. 3, 1998) <http://www.printrakinternational.com and links>, 10 pages, Copyright 1996.

*Live-Scan Products: Tenprinter® 1133S* (visited Apr. 23, 1999) <http://www.digitalbiometrics.com/Products/tenprinter.htm>, 4 pages. (Tenprinter 1133S released in 1996).

*TouchPrint™ 600 Live-Scan System* (visited Apr. 23, 1999) <http://www.identix.com/products/livescan.htm>, 4 pages, Copyright 1996-1998.

* cited by examiner

CALIBRATION AND CORRECTION IN A FINGERPRINT SCANNER

This application is a continuation of application Ser. No. 09/425,947, filed Oct. 25, 1999, now U.S. Pat. No. 6,658, 164 which claims the benefit of application Ser. No. 60/147, 498, filed Aug. 9, 1999, each of which is incorporated in its entirety herein by reference.

CROSS-REFERENCE TO RELATED APPLICATIONS

This patent application is potentially related to the following co-pending U.S. utility patent applications:

1. "System and Method for Transferring a Packet with Position Address and Line Scan Data Over an Interface Cable," Ser. No. 09/425,949, by W. Scott et al., filed Oct. 25, 1999 and incorporated in its entirety herein by reference;

2. "Adjustable, Rotatable Finger Guide in a Tenprint Scanner with Movable Prism Platen," Ser. No. 09/422,937, by J. Carver et al., filed Oct. 22, 1999, now abandoned, and incorporated in its entirety herein by reference;

3. "Method, System, and Computer Program Product for a GUI to Fingerprint Scanner Interface," Ser. No. 09/425, 958, by C. Martinez et al., filed Oct. 25, 1999 and incorporated in its entirety herein by reference; and 4. "Method, System, and Computer Program Product for Control of Platen Movement during a Live Scan," Ser. No. 09/425,888, by G. Barton et al., filed Oct. 25, 1999 and incorporated in its entirety herein by reference.

BACKGROUND OF THE INVENTION

1. Field of the Invention

The present invention is generally directed to the field of biometric imaging. In particular, the present invention is directed to a method for calibrating and correcting settings in a fingerprint scanner.

2. Related Art

Biometrics is a science involving the analysis of biological characteristics. Biometric imaging captures a measurable characteristic of a human being for identity purposes. See, e.g., Gary Roethenbaugh, *Biometrics Explained*, International Computer Security Association, Inc., pp. 1–34, (1998), which is incorporated herein by reference in its entirety.

One type of biometric imaging system is an Automatic Fingerprint Identification System (AFIS). Automatic Fingerprint Identification Systems are used for law enforcement purposes. Law enforcement personnel collect fingerprint images from criminal suspects when they are arrested. Law enforcement personnel also collect fingerprint images from crime scenes. These are known as latent prints.

Tenprint scanners are a common type of AFIS system. Tenprint scanners produce forensic-quality tenprint records of rolled and plain impression fingerprint images. Tenprint scanners must be sufficiently reliable to meet rigid image standards, such as NIST image requirements. Normal usage of the tenprint scanner over time, as well as variations in temperature, dirt and dust, etc., cause the performance level of the tenprint scanner to drift with respect to certain optimal settings. Settings needing periodic adjustment and correction include brightness, contrast, focus, and geometric distortion. What is needed is a system and method that periodically calibrates the tenprint scanner to maintain optimal settings. What is also needed is a system and method of calibration and correction that provides increased tolerances in the optical design of the tenprint scanner.

SUMMARY OF THE INVENTION

The present invention solves the above-mentioned needs by providing a system and method for performing calibration and correction of optimal settings in a fingerprint scanner. Briefly stated, the present invention is directed to a calibration and correction procedure for a fingerprint scanner. The calibration and correction procedure performs an automatic calibration (auto-calibration) procedure and a gray level linearity procedure. The auto-calibration procedure includes a brightness function to correct for distortions in brightness, a focus check function to identify when the fingerprint scanner is out of focus, and a geometric distortion function to correct for imperfect linearity in the geometry of the fingerprint scanner. The gray level linearity procedure corrects for linear distortions in brightness and contrast of gray levels.

The present invention performs the auto-calibration of the fingerprint scanner on a periodic basis. Calibration of the fingerprint scanner may also be performed at the request of an operator as well. Automatic calibration on a frequent basis, such as a daily basis, provides increased tolerances in the optical design of the fingerprint scanner.

The gray level linearity calibration and correction procedure is performed at the factory and/or by field service technicians. In another embodiment of the present invention, the gray level linearity calibration and correction procedure is performed by an operator in a manner similar to the auto-calibration procedure.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
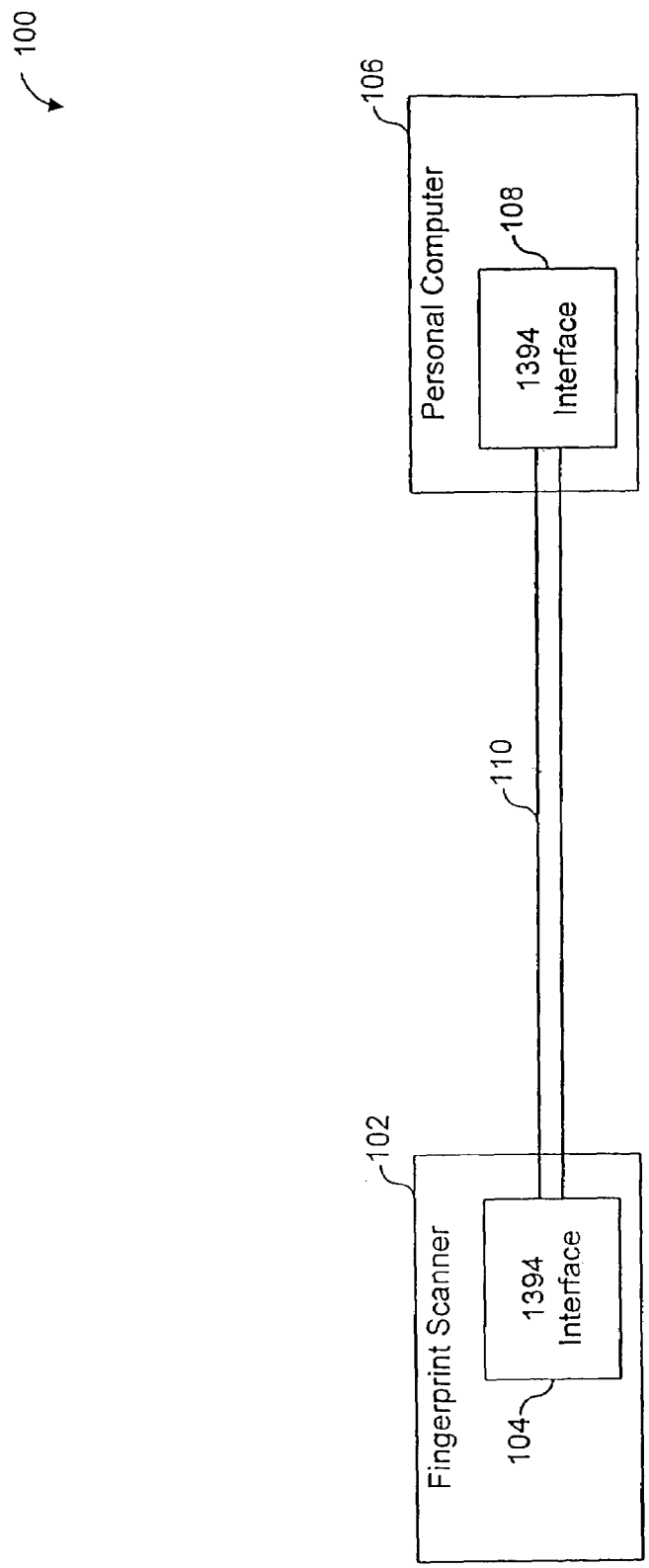
FIG. 1 is a high level block diagram illustrating an exemplary tenprint scanner according to an embodiment of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "live scan" refers to a scan of any type of fingerprint image by a fingerprint scanner. A live scan can include, but is not limited to, a scan of a finger, a finger roll, a flat finger, slap print of four fingers, thumb print or palm print.

The term "fingerprint scanner" is any type of scanner which can obtain an image of all or part of one or more fingers in a live scan including, but not limited to, a tenprint scanner. A "tenprint scanner" is a scanner that can capture images representative of ten fingers of a person. The captured images can be combined in any format including, but not limited to, an FBI tenprint format.

The term "platen" refers to a component that include an imaging surface upon which at least one finger is placed during a live scan. A platen can include, but is not limited to, an optical prism, set of prisms, or set of micro-prisms.

TABLE OF CONTENTS

I. Overview of the Tenprint Scanner
II. Overview of the Calibration and Correction Procedure
III. The Auto-Calibration Procedure
   A. Auto-Calibration Target
   B. Brightness Function
   C. Focus Check
   D. Geometric Distortion Function
IV. Gray Level Linearity Calibration and Correction Procedure
V. Environment
VI. Conclusion I. Overview of the Tenprint Scanner The present invention is a system and method for providing calibration and correction of a tenprint scanner. Prior to describing the present invention in detail, a simplified description of an exemplary tenprint scanner is provided.

FIG. 1 is a high level block diagram illustrating an exemplary tenprint scanner according to an embodiment of the present invention. A tenprint scanner 100 comprises a fingerprint scanner 102, a personal computer 106, and an interface cable 110. Interface cable 110 couples fingerprint scanner 102 to personal computer 106.

Fingerprint scanner 102 comprises, inter alia, a first 1394 interface card. Fingerprint scanner 102 captures an image of a fingerprint. The fingerprint image, along with corresponding position data, are combined into a packet. The packet is sent from fingerprint scanner 102 using first interface card 104 to PC 106 via interface cable 110.

Personal computer 106 comprises, inter alia, a second 1394 interface card 108. Second interface card 108 receives the packet for PC 106. PC 106 decodes the packet and forms an image of the fingerprint to be displayed BY PC 106.

The present invention is described in terms of the above exemplary tenprint scanner. Description in these terms is provided for convenience only. It is not intended that the present invention be limited to application in this exemplary tenprint scanner. In fact, after reading the following description, it will become apparent to a person skilled in the relevant art(s) how to implement the calibration and correction procedure of the present invention in other biometric systems in which a biometric image of a measurable characteristic of a human being is captured.

II. Overview of the Calibration and Correction Procedure

The calibration and correction procedure of the present invention uses calibration targets that are scanned into fingerprint scanner 102 to perform calibration and correction of optimal settings in the tenprint scanner. In one embodiment, after the calibration targets have been scanned by fingerprint scanner 102, the target information is copied over to PC 106 via interface cable 106. The actual calibration and correction is performed on the computer side of tenprint scanner 100. Alternatively, fingerprint scanner 102 can carry out all or part of the calibration and correction procedure. Each calibration target will be described in detail with reference to FIGS. 4 and 14.

Figure 2:
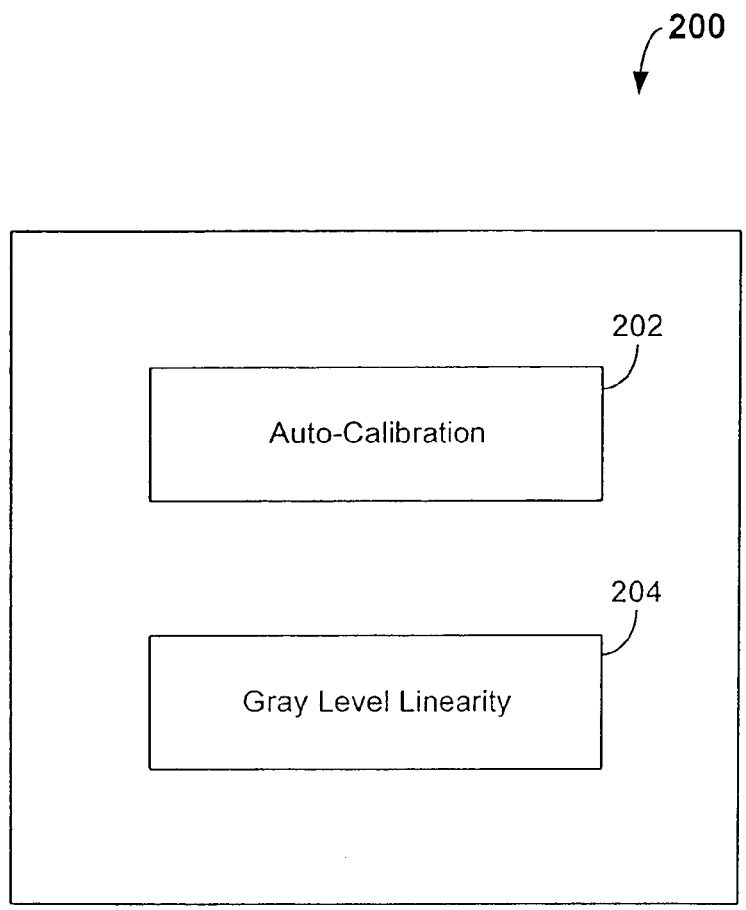
FIG. 2 is a high level block diagram illustrating a calibration and correction procedure according to an embodiment of the present invention.

FIG. 2 is a high level block diagram illustrating a calibration and correction procedure according to an embodiment of the present invention. A calibration and correction procedure 200 is comprised of an auto-calibration procedure 202 and a gray level linearity calibration and correction procedure 204. Auto-calibration procedure 202 is performed on a daily basis. Gray level linearity procedure 204 is performed at the factory or by a field technician. Gray level linearity procedure 204 may also be performed by an operator of tenprint scanner 100. Both auto-calibration procedure 202 and gray level linearity procedure 204 will be described below with reference to FIGS. 3–12 and 13–16, respectively.

III. The Auto-Calibration Procedure

Figure 3:
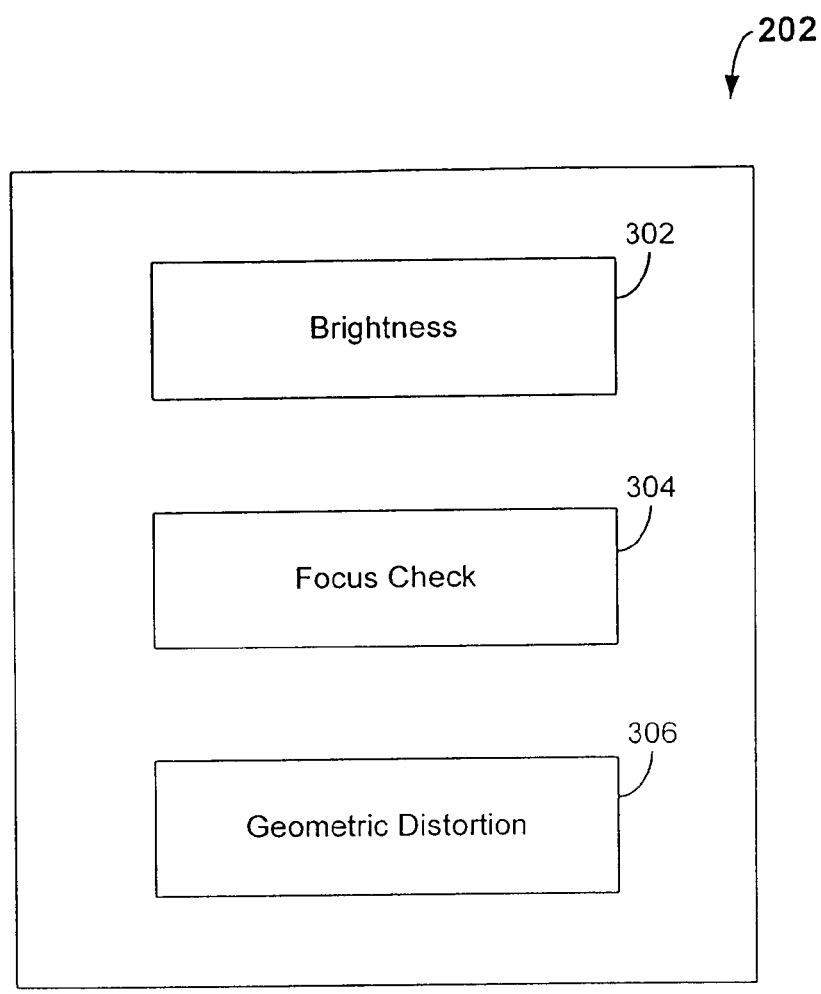
FIG. 3 is a high level block diagram illustrating an auto-calibration procedure according to an embodiment of the present invention.

FIG. 3 is a high level block diagram illustrating auto-calibration procedure 202 according to an embodiment of the present invention. Auto-calibration procedure 202 is comprised of three functions: a brightness function 302, a focus check function 304, and a geometric distortion function 306. In one embodiment of the present invention, functions 302–306 are performed as one routine. In another embodiment of the present invention, functions 302–306 are performed as separate routines. Brightness function 302 corrects for distortions in brightness due to pixel to pixel variations in the gain and offset of an image sensor. Brightness function 302 will be described in detail with reference to FIGS. 6, and 7A–7C. Focus check function 304 identifies when tenprint scanner 100 is out of focus. Focus check function 304 will be described in detail with reference to FIGS. 8A–8C. Geometric distortion function 306 corrects for imperfect linearity in the geometry. Geometric distortion function 306 will be described below with reference to FIGS. 9–12.

A. Auto-Calibration Target

Figure 4:
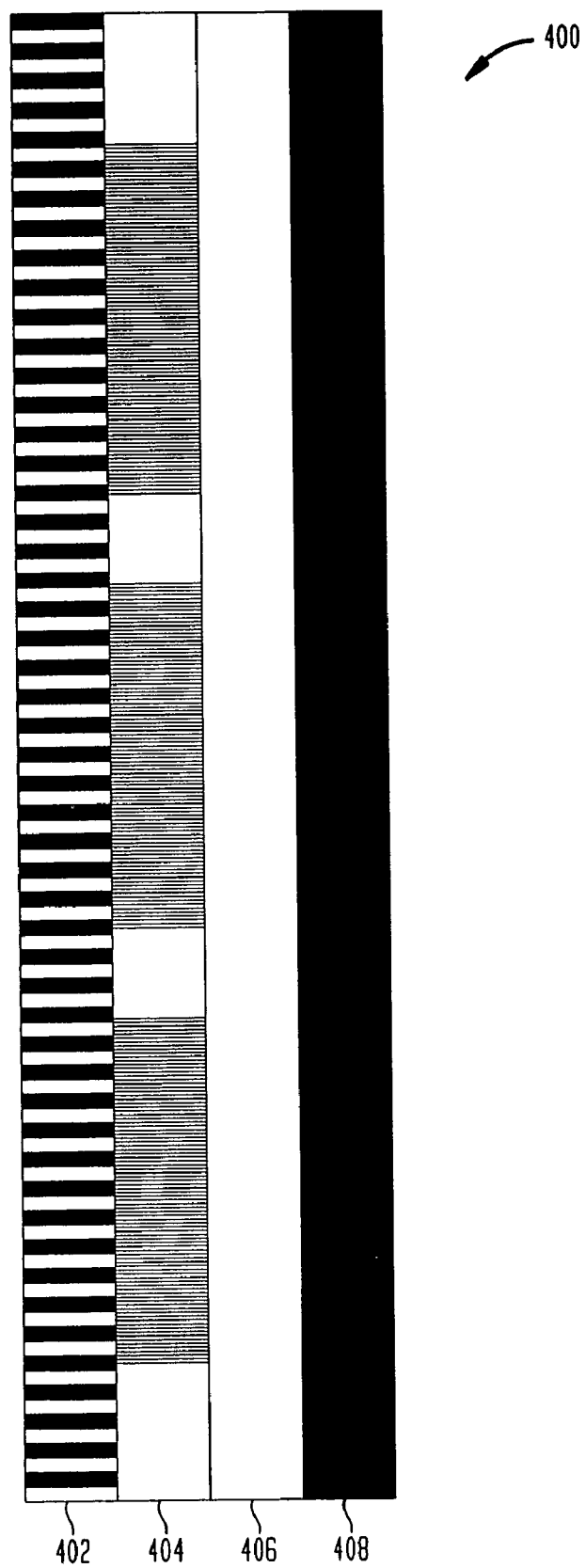
FIG. 4 is a diagram illustrating an exemplary calibration target for the auto-calibration procedure of the present invention.

FIG. 4 is a diagram (not drawn to scale) illustrating an exemplary calibration target 400 for auto-calibration procedure 202. Calibration target 400 is comprised of four sections: a geometry strip 402, a focus strip 404, a bright or white strip 406, and a dark or black strip 408. Geometry strip 402 is used with geometric distortion function 306. Focus strip 404 is used with focus check function 304. Bright strip 406 and dark strip 408 are used with brightness function 302.

Geometry strip 402 is comprised of a Ronchi ruling of alternating white and black bars. The Ronchi ruling of geometry strip 402 has a fifty percent (50%) duty cycle. In other words, the width of the black bars are equivalent to the width of the white bars. The spacing is one cycle per millimeter. Therefore, the period is one millimeter.

Focus strip 404 is comprised of three Ronchi rulings of alternating white and black bars, each Ronchi ruling is separated by white space. The three Ronchi rulings of focus strip 404 have a fifty percent (50%) duty cycle. The spacing is 15 cycles per millimeter. The three Ronchi rulings in focus target section 404 correspond to three different points of potential scan area or image area of a prism in tenprint scanner 100.

Figure 5:
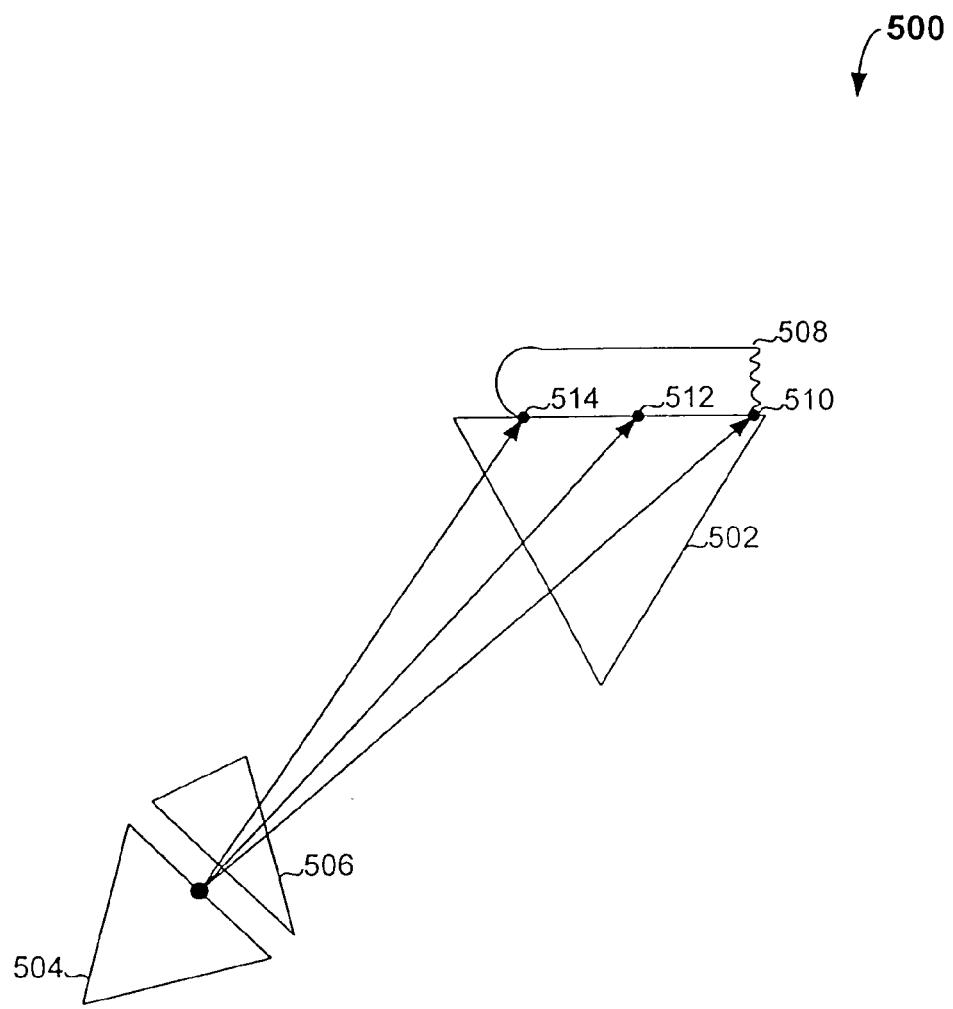
FIG. 5 is a diagram illustrating three different points of potential scan area or image area of a fingerprint scanner according to an embodiment of the present invention.

FIG. 5 is a diagram (not drawn to scale) illustrating the three different points of a potential scan area or image area of fingerprint scanner 102. Shown in FIG. 5 are a prism 502, a camera 504, a plurality of lenses 506 and a finger 508. Finger 508 is placed directly on the flat surface of prism 502. Camera 504 is looking toward finger 508 through a plurality of lenses 506 and a mirror (not shown). The longest distance in which camera 504 must focus is indicated as focus point 510. The shortest distance in which camera 504 must focus is indicated as focus point 514. A distance midway between focus point 514 and focus point 510 in which camera 504 must focus is indicated as focus point 512. A depth of focus issue arises when varying lengths of focus must be attained. The angle at which camera 504 is tilted compensates for the varying distances of focus points 510, 512, and 514. The focus of finger 508 must be as good at focus point 514 as it is at focus points 510 and 512.

Referring back to FIG. 4, the three Ronchi rulings of focus strip 404 correspond to the three focus points 510, 512, and 514 of FIG. 5.

Bright strip 406 is a white or a bright gray strip. The color of strip 406 is consistent throughout having a known brightness, density, and reflectivity.

Dark strip 408 is a black or dark gray strip. The color of strip 408 is consistent throughout having a known brightness, density, and reflectivity.

B. Brightness Function

Figure 6:
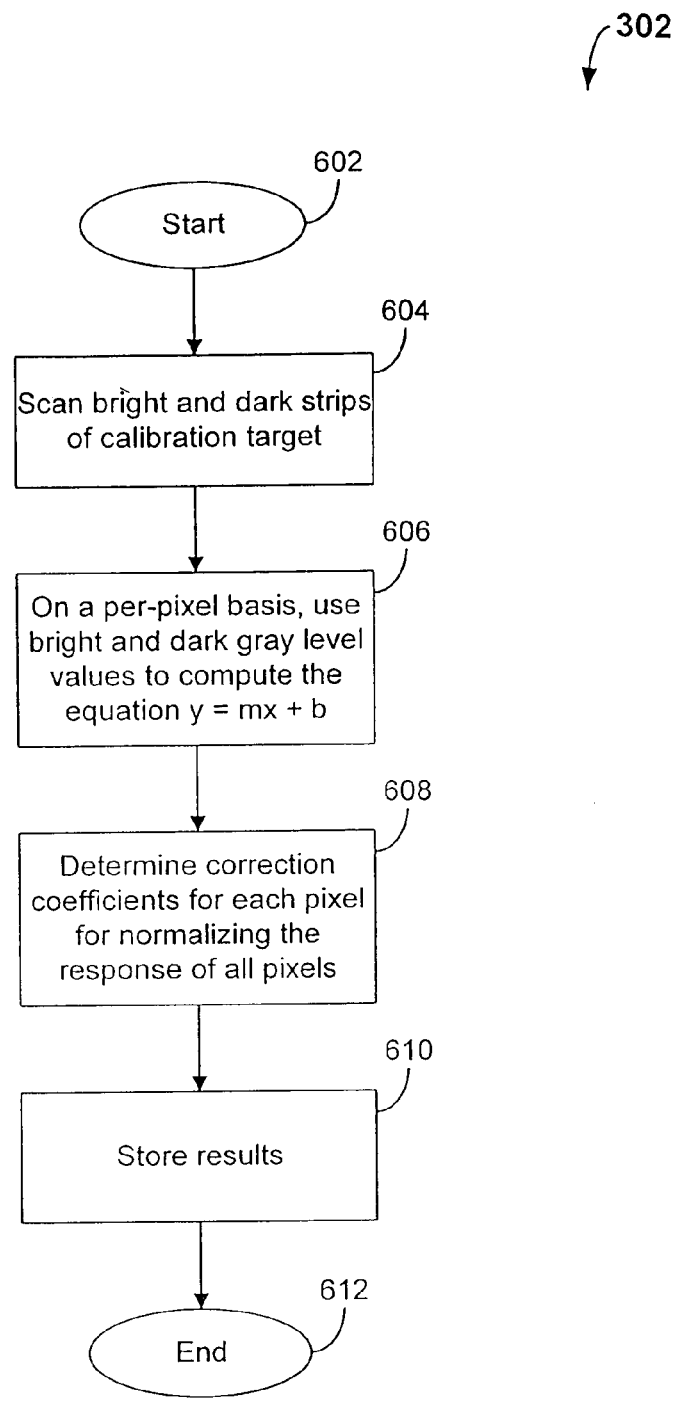
FIG. 6 is a flow diagram representing a brightness function for an auto-calibration procedure according to an embodiment of the present invention.

FIG. 6 is a flow diagram representing brightness function 302 for auto-calibration procedure 202. The process begins with step 602 where control immediately passes to step 604.

In step 604, bright and dark strips 406 and 408 of auto-calibration target 400 are scanned multiple times using fingerprint scanner 102. The scanned strips are averaged to eliminate any noise, resulting in one scanned bright strip and one scanned dark strip. The reflectivity of bright strip 406 is ninety percent (90%). The reflectivity of dark strip 408 is ten percent (10%). Although the present invention is described using reflectivity measurements of 90% and 10% for bright and dark strips 406 and 408, the present invention is not limited to these reflectivity values. One skilled in the relevant art(s) would know that other reflectivity values for both bright and dark strips 406 and 408 may be used without departing from the scope of the present invention.

Figure 7A:
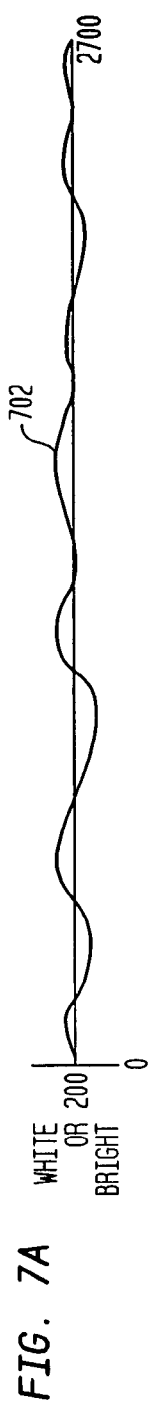
FIG. 7A is a diagram illustrating an exemplary bright gray level recorded by an image sensor for each pixel in a bright test strip.
Figure 7B:
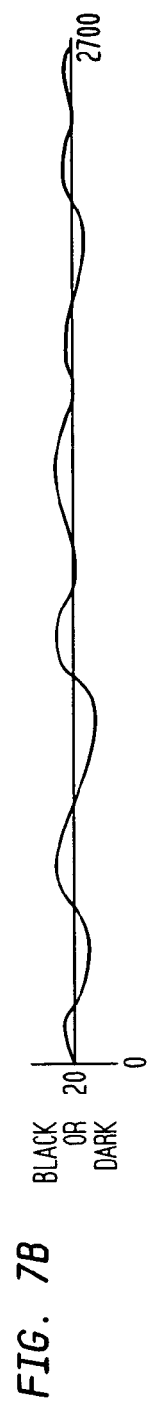
FIG. 7B is a diagram illustrating an exemplary dark gray level recorded by an image sensor for each pixel in a dark measured test strip.

The present invention uses a gray level recorded by the image sensor for each pixel of the scanned bright strip and the scanned dark strip. FIG. 7A is a diagram illustrating a graphical representation of an exemplary bright gray level 702 recorded by the image sensor for each pixel on the scanned bright strip. FIG. 7B is a diagram illustrating a graphical representation of an exemplary dark gray level 704 recorded by the image sensor for each pixel on the scanned dark strip. Ideally, both graphs should resemble a straight line since the gray levels throughout bright strip 406 and dark strip 408 do not vary. For example, the gray level recording for bright strip 406 might read 200, while the gray level recording for dark strip 408 might read 20. In reality, the gray level recordings for both bright gray level 702 and dark gray level 704 vary in brightness and darkness, respectively, over pixels 0 to 2700. Bright gray level 702 is shown in FIG. 7A to fluctuate around a value of 200. Dark gray level 704 is shown in FIG. 7B to fluctuate around a value of 20. This is due to fabrication variations in the silicon of the CMOS image sensor.

Figure 7C:
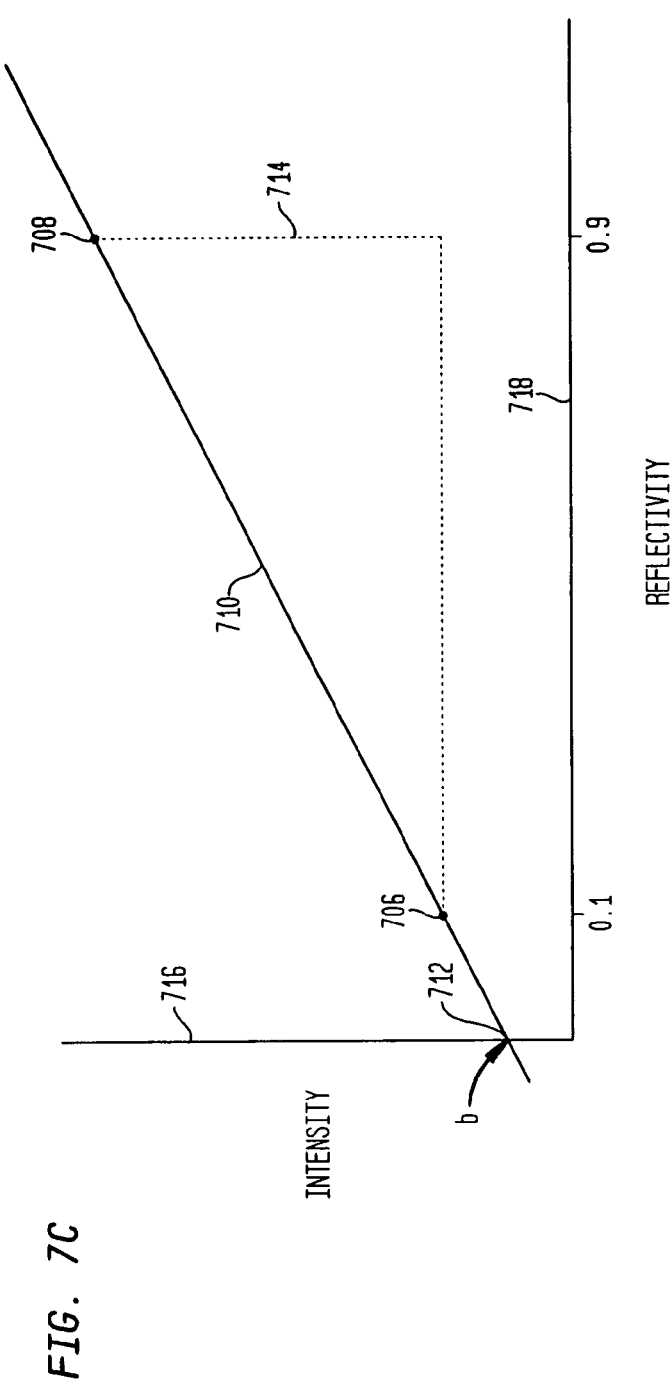
FIG. 7C is a graphical representation of gray level intensity versus reflectivity for corresponding bright and dark pixels.

Referring back to FIG. 6, step 604, control then passes to step 606. In step 606, bright and dark gray level values are used to compute the equation of a line ($y=mx+b$) on a per-pixel basis. FIG. 7C is a diagram illustrating a graphical representation of gray level intensity 716 versus reflectivity 718 for corresponding pixels of bright and dark gray levels 702 and 704 (shown in FIGS. 7A and 7B). For each pixel, the bright and dark gray level is plotted versus reflectivity. As previously stated, the reflectivity of bright strip 406 is 90% and the reflectivity of dark strip 408 is 10%. For example, pixel 14 might have a gray level recording of 200 for bright gray level 702 and a gray level recording of 17 for dark gray level 704. A bright gray level 708 for pixel 14 is plotted at 90% reflectivity while a dark gray level 706 for pixel 14 is plotted at 10% reflectivity. A straight line 710 is drawn through bright gray level 708 and dark gray level 706 for pixel 14. The equation of straight line 710 is determined by a y-intercept value, b 712 and a slope of line 710, m 714, where m 714 is equal to the rise over the run. The equation of a straight line, the y-intercept, the slope, and the rise over the run are well known mathematical concepts.

Referring back to step 606 in FIG. 6, control then passes to step 608. In step 608, correction coefficients for each pixel are determined that would cause all of the pixels of bright gray level 702 and dark gray level 704 to respond uniformly. Correction coefficients for each pixel include an offset and a gain. The offset must be subtracted from the pixel gray level value so that all equations of the line pass through the origin. The gain is multiplied by the pixel gray level value to cause all slopes to be equal. This is accomplished by determining y-intercept value or b 712 and slope m 714 of straight line 710 for each pixel. One over m 714 (1/m) is the gain value and y-intercept, b 712 is the offset value.

In a preferred embodiment of the present invention, the corrected pixel value is $$P_{corr}=(P_{measured}-b)/m,$$

where Pcorr is the corrected pixel value, Pmeasured is the measured pixel value, b is the offset value, and 1/m is the gain.

In another embodiment, a small amount of tweaking may occur to accurately adjust the corrected pixel value. In this embodiment, the corrected pixel value is $$P_{corr}=(P_{measured}-b)*\alpha/m$$

where: $\alpha$ is a multiplier used to adjust the overall brightness up or down.

Multiplying all pixels by $\alpha$ may introduce holes or aliasing affects because no smoothing or interpolating techniques are employed. Rather than tweak the corrected pixel value using $\alpha$, a preferred method would be to adjust the gain and/or exposure time on the analog side of tenprint scanner 100 (that is, prior to digitizing the data for transmission to personal computer 106). Control then passes to step 610.

In step 610, slope m 714 or gain value and y-intercept, b 712 or offset value are stored for each pixel value. The gain and offset values are utilized for normalizing the brightness of each fingerprint scanned into tenprint scanner 100. Control then passes to step 612 where the process ends.

C. Focus Check Function

Figure 8A:
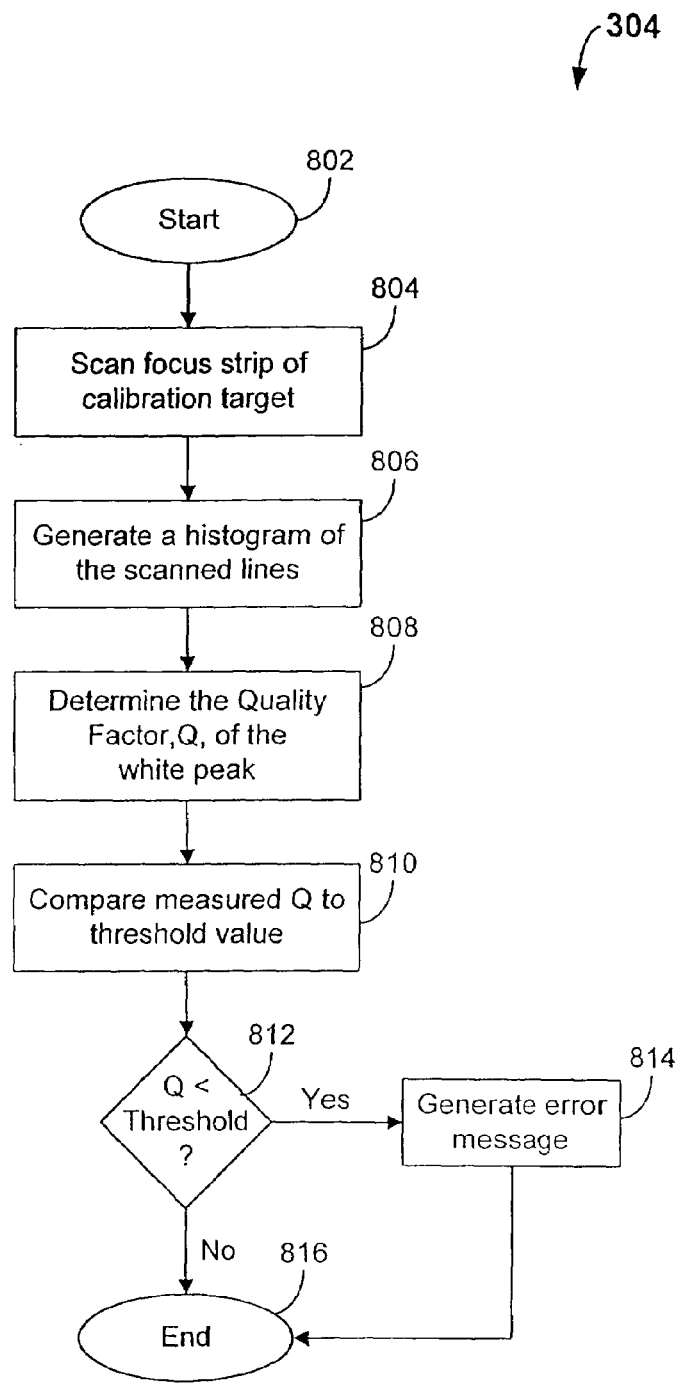
FIG. 8A is a flow diagram representing a focus check function for an auto-calibration procedure according to an embodiment of the present invention.

FIG. 8A is a flow diagram illustrating focus check function 304 for auto-calibration procedure 202. Focus check function 304 does not correct for focus. Instead, focus check function 304 checks to see if tenprint scanner 100 has gone out of focus. The process begins with step 802 where control immediately passes to step 804.

In step 804, focus test strip 404 is scanned using fingerprint scanner 102 multiple times and averaged to eliminate any noise. The average of multiple scans of focus test strip 404 results in a measured focus test strip. Control then passes to step 806.

In step 806, a histogram is generated using the measured focus test strip. Each pixel is quantized into 8 bits, with 256 discrete values in which to fall. The dimension of a pixel is 7 micrometers. The histogram is comprised of intensity or brightness values versus gray level values. Bins in the histogram correspond to each possible gray level value. To generate the histogram, the intensity or brightness level of each pixel in the measured focus test strip is accounted for in the proper gray level value bin by maintaining a tally for each gray level value bin. That is, the pixels of the measured focus test strip that fall within a specific gray level value are counted and the total count is placed in the corresponding gray level value bin.

As previously stated, focus check strip 404 is comprised of three Ronchi rulings, each Ronchi ruling comprised of alternating light and dark bars having a fifty percent (50%) duty cycle. Each Ronchi ruling is separated by white space. Histograms are generated for each of the three Ronchi rulings for determining the focus at the three focus points 510, 512, and 514. That is, focus point 514 located at the tip of finger 508, focus point 512 located midway between focus point 514 and 510, and focus point 510 located at the farthest end of finger 508 (as shown in FIG. 5).

Figure 8B:
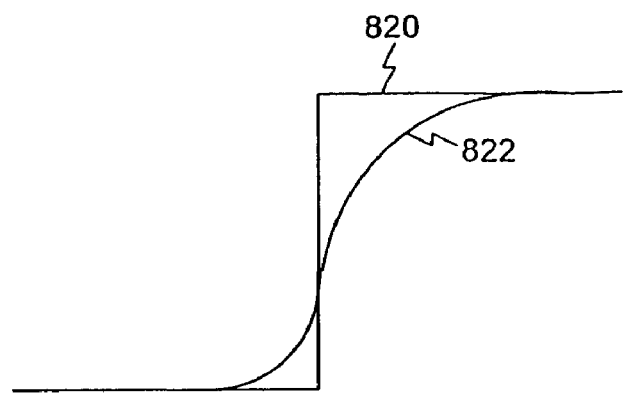
FIG. 8B is a diagram illustrating an exaggerated example of an edge of a Ronchi ruling scanned using a fingerprint scanner versus an edge of a Ronchi ruling from a focus check strip of a calibration target prior to being scanned.

Referring now to FIG. 8B, the limitations of the optics of tenprint scanner 100 causes the Ronchi rulings scanned into fingerprint scanner 102 to have a rounding effect instead of the sharp transitions between dark and light bars as shown in focus strip 404. FIG. 8B is a diagram illustrating an exaggerated example of a scanned edge of a Ronchi ruling using fingerprint scanner 102 versus an edge of a Ronchi ruling from focus strip 404. FIG. 8B shows a sharp edge 820 of a Ronchi ruling from focus check strip 404 and a rounded edge 822 of a scanned Ronchi ruling using fingerprint scanner 102. For illustrative purposes, the dark bars have a gray level intensity of 0 and the bright bars have a gray level intensity of 250. Sharp edge 820 illustrates an instantaneous transition from an intensity of zero to an intensity of 250, for example. Ideally, a histogram representation of the Ronchi ruling should have a lot of values around zero (0) representative of the dark bars and a lot of values around 250 or the grayscale value of the light bars.

Figure 8C:
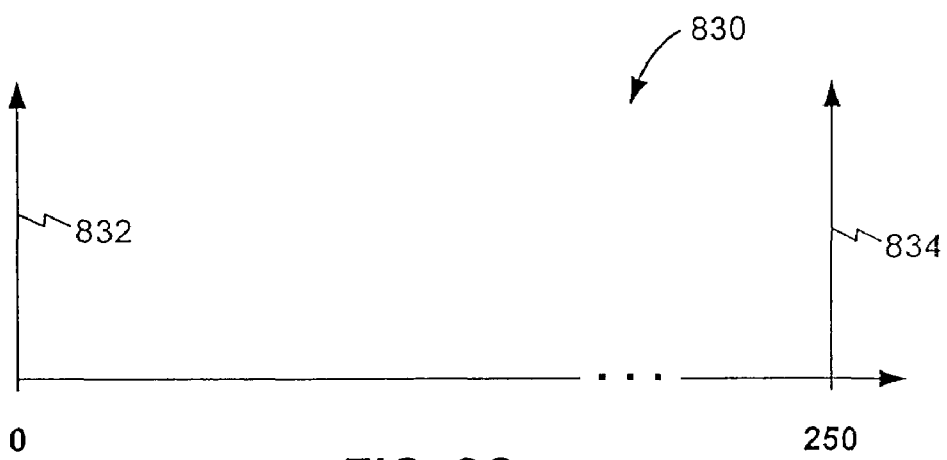
FIG. 8C is a diagram illustrating an ideal histogram for a Ronchi ruling.
Figure 8D:
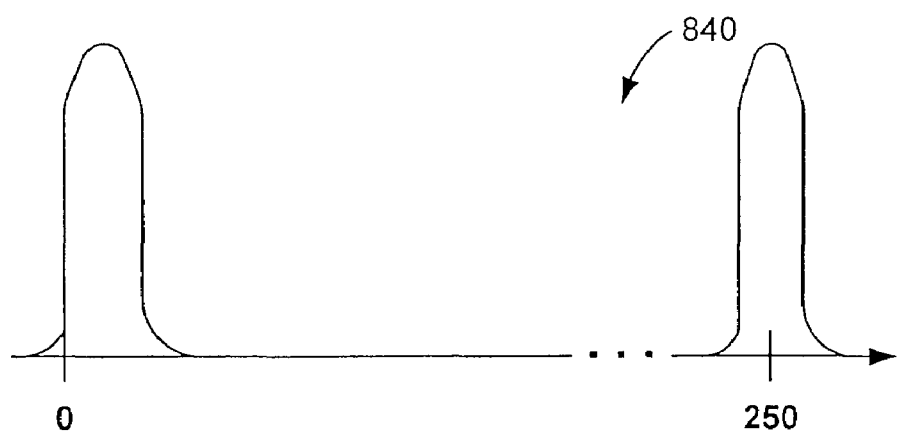
FIG. 8D is a diagram illustrating a histogram for a scanned image of a Ronchi ruling.

FIG. 8C is a diagram illustrating an ideal histogram 830 for a Ronchi ruling. FIG. 8C shows an accumulation of values at zero (832) representative of the dark bars in the Ronchi ruling and an accumulation of values at 250 (834) representative of the light bars in the Ronchi ruling. An ideal image sensor that captures a Ronchi ruling image would record pixels with an intensity of all zeroes for the dark pixels and an intensity representative of the light bars for the light pixels. In reality, the image sensor captures Ronchi ruling 822 having a rounded effect at the edges, as shown in FIG. 8B. Because of the rounded edges, a histogram will have a lot of values hovering around zero and a lot of values hovering around 250, for example, each resembling a distribution curve or hump. FIG. 8D is a diagram illustrating a histogram 840 for a scanned image of a Ronchi ruling. FIG. 8D shows a histogram having values hovering around zero (representative of the dark bars) and having values hovering around 250 (representative of the light bars). Referring back to FIG. 8A, step 806, control then passes to step 808.

In step 808, the quality factor, Q, of the bright peak in the histogram is determined. The quality factor, Q, is the ratio of the height of the bright peak to its width at half amplitude. Note that the bright peak is the peak hovering around 250 in FIG. 8D. The quality factor, Q, is directly related to the sharpness of focus. The taller and narrower the hump, the better the focus. Control then passes to step 810.

In step 810, the measured Q is compared to a preset threshold value. Control then passes to decision step 812.

In decision step 812, it is determined whether the quality factor, Q, is less than the preset threshold value. If it is determined that the quality factor, Q, is less than the preset threshold value, control passes to step 814.

In step 814, an error message is generated indicating that tenprint scanner 100 needs refocusing. This could mean cleaning or aligning lenses 506 in fingerprint scanner 102. A maintenance call can be placed to have a field engineer correct the focus. Control then passes to step 816. In another example, a servo-control system can be added to automatically adjust the position of lenses 506 to maximize the quality factor, Q, value.

Returning to decision step 812, if it is determined that the quality factor, Q, is not less than the threshold value (that is, fingerprint scanner 102 is properly focused), control passes to step 816.

In step 816, the process ends. Note that the above process is performed for each of the three Ronchi rulings in focus strip 404.

D. Geometric Distortion Function

Figure 9:
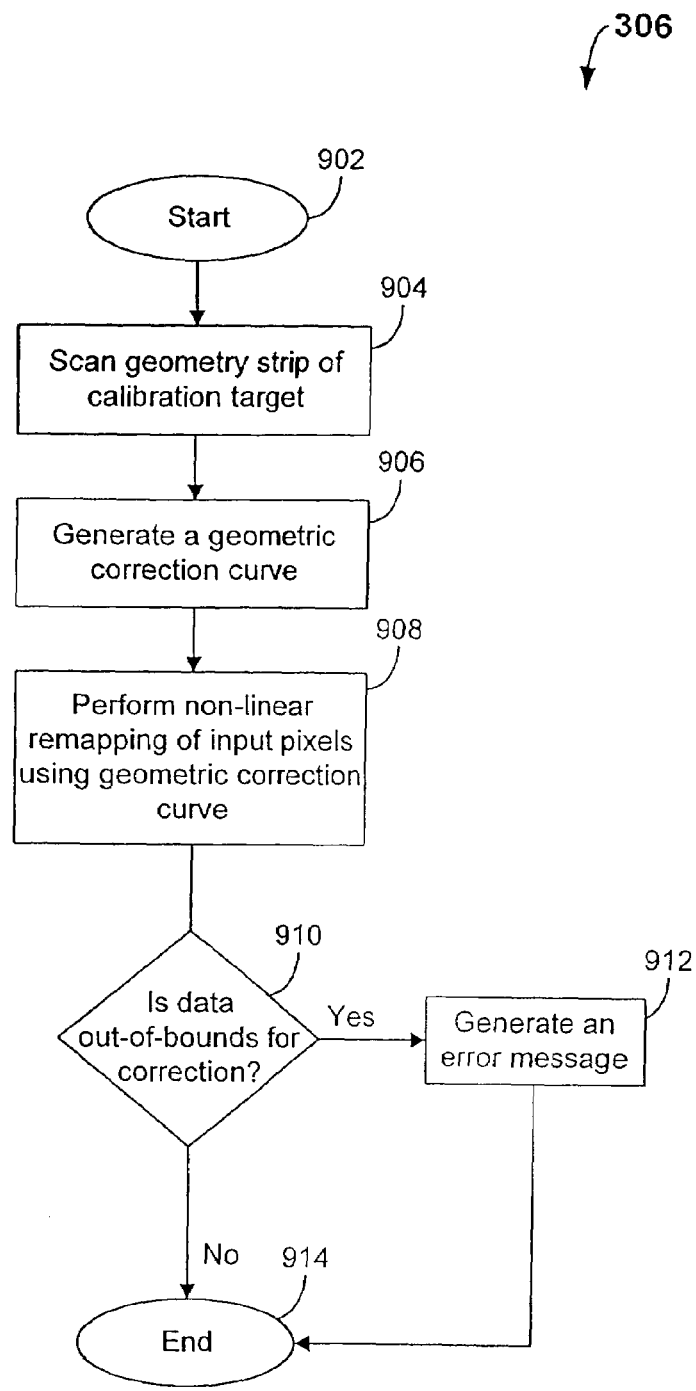
FIG. 9 is a flow diagram representing a geometric distortion function for an auto-calibration procedure according to an embodiment of the present invention.

FIG. 9 is a flow diagram representing geometric distortion function 306 for auto-calibration procedure 202. Geometric distortion function 306 corrects for an imperfect linear geometry. The process begins in step 902 where control immediately passes to step 904.

In step 904, geometry strip 402 of auto-calibration target 400, comprised of a plurality of Ronchi rulings, is scanned multiple times using fingerprint scanner 102. The scanned geometry strips 402 are averaged to eliminate any noise. The average of multiple scans of geometry strip 402 results in a measured geometry test strip. Control then passes to step 906.

Figure 10:
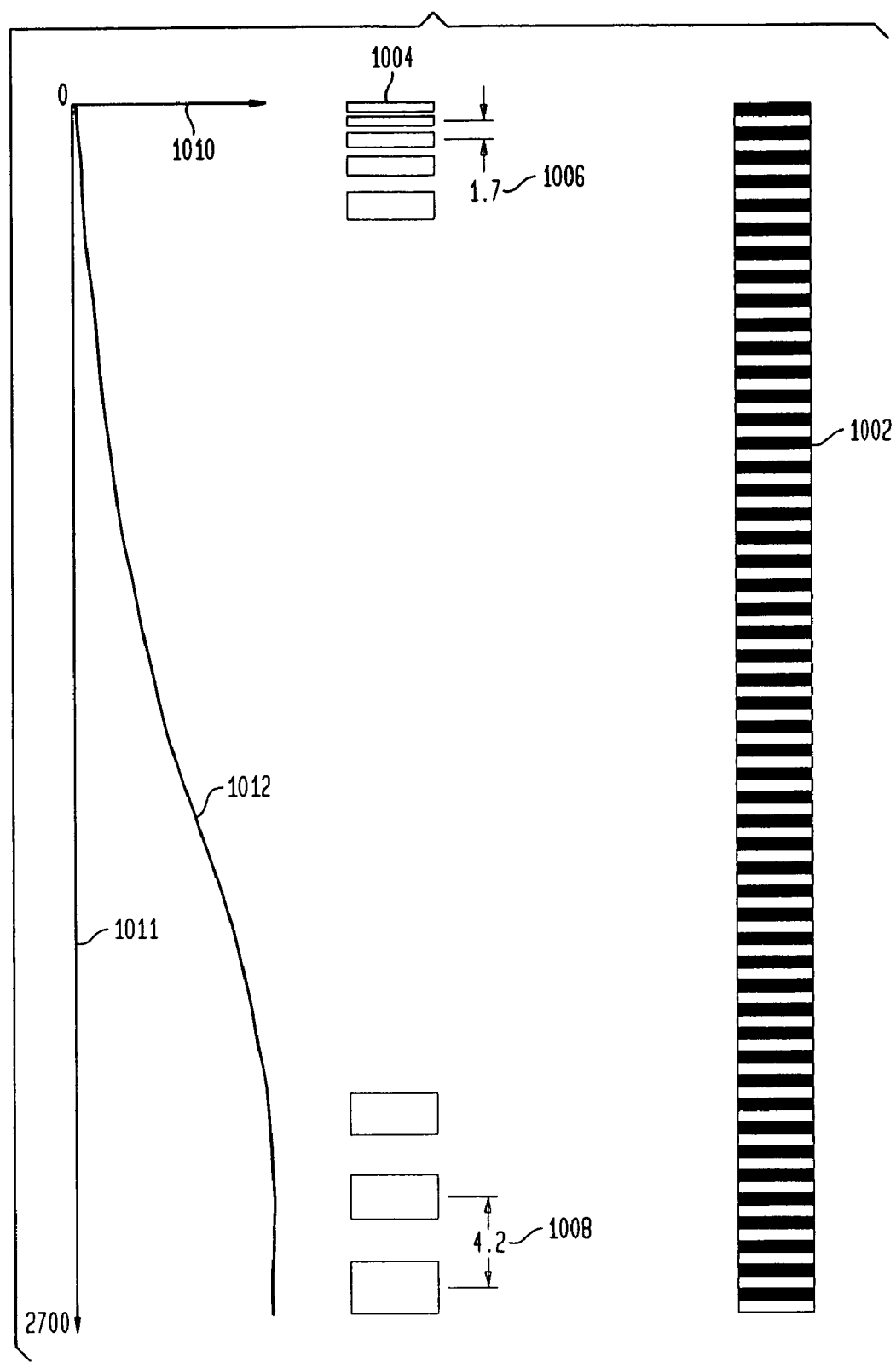
FIG. 10 is a diagram illustrating the generation of a correction curve.

In step 906, a geometric correction curve consisting of a data point per pixel is generated. FIG. 10 is a diagram illustrating the generation of a correction curve. Shown in FIG. 10 are geometry strip 1002, a scanned and averaged image of geometry strip 402 or measured geometry test strip 1004, and an exemplary geometric correction curve 1012. As previously stated, the Ronchi rulings of geometry strip 402 are precisely one millimeter apart. As can be seen from FIG. 10, measured geometry test strip 1004 results in lines that are fairly close together on one end, and as the pattern progresses, the lines become fatter and farther apart on the other end. Physically, each bar is the same distance apart (as shown in geometry strip 402), but measured geometry test strip 1004 might be 1.7 pixels apart (1006) at one end and 4.2 pixels apart (1008) at the other end.

To generate geometric correction curve 1012, the exact centers of each bar is determined using a sub-pixel resolution algorithm. The sub-pixel resolution algorithm is well known to those skilled in the relevant art(s). The sub-pixel resolution algorithm results in precise floating point number center points for each pixel. Geometric correction curve 1012 includes a y-axis of center points 1010 and an x-axis of pixels 1011. Geometric correction curve 1012 is therefore a plot of the exact center points for each pixel versus pixel number.

Referring back to FIG. 9, step 906, once correction curve 1012 has been generated, control then passes to step 908.

In step 908, non-linear remapping of input pixels using geometric correction curve 1012 is performed. The non-linear remapping of input pixels using geometric correction curve 1012 is described in detail with reference to FIG. 11. Control then passes to decision step 910.

In decision step 910, it is determined whether the data is out of bounds for correction. If the data is out of bounds for correction, control passes to step 912.

In step 912, an error message is generated indicating that the data is out of bounds for correction. Control then passes to step 914.

Returning to decision step 910, if it is determined that the data is not out of bounds, control then passes to step 914. In step 914, the process ends.

Figure 11:
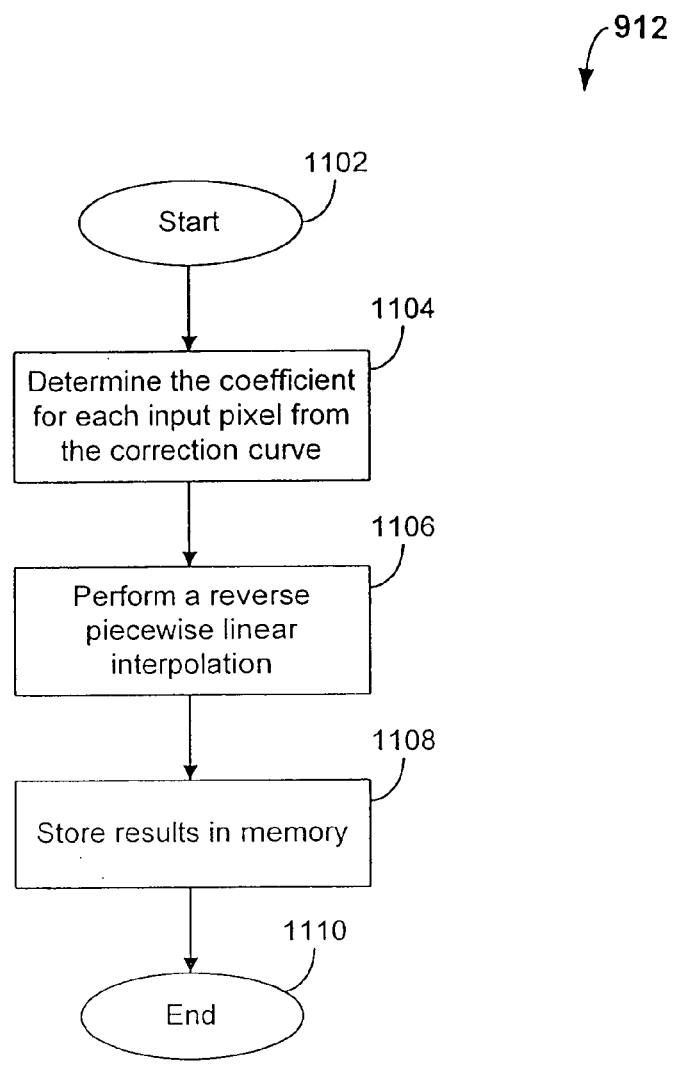
FIG. 11 is a flow diagram of a non-linear remapping of input pixels using a geometric correction curve.

A flow diagram of the non-linear remapping of input pixels using geometric correction curve 1012 is shown in FIG. 11. The process begins with step 1102 where control immediately passes to step 1104.

In step 1104, a coefficient is determined for each input pixel from geometric correction curve 1012. The coefficient is extracted from geometric correction curve 1012. That is, for each pixel value, a corresponding floating point number is taken from curve 1012 as the coefficient for that pixel value. Control then passes to step 1106.

Figure 12A:
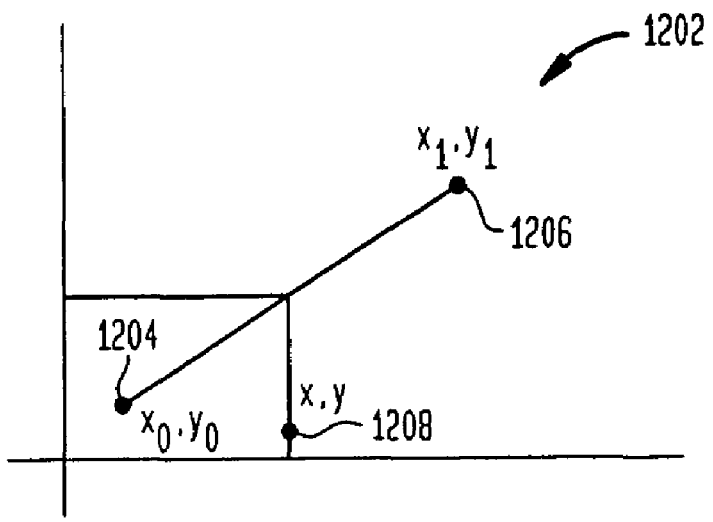
FIG. 12 is a diagram illustrating a linear interpolation versus a reverse piecewise linear interpolation.
Figure 12B:
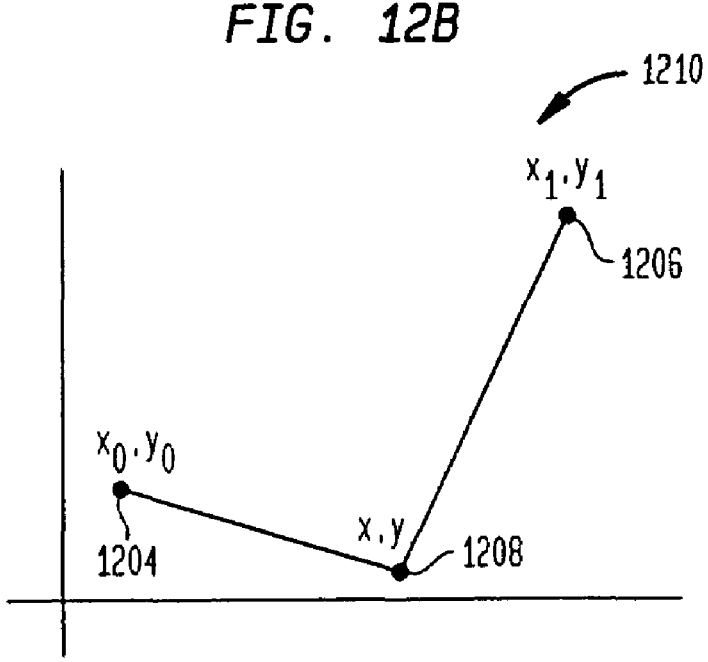

In step 1106, a reverse piecewise linear interpolation is performed. FIG. 12 is a diagram illustrating a simple linear interpolation versus a reverse piecewise linear interpolation. With simple linear interpolation, values are to be determined that lie between given sample values. With reverse piecewise linear interpolation, the opposite occurs. A sample value is given and values surrounding that sample value must be determined. FIG. 12 shows a simple linear interpolation example 1202 and a reverse piecewise linear interpolation example 1210. In simple linear interpolation example 1202, only two sample points x0 1204 and x1 1206 with basic values $y_0=f(x_0)$, $y_1=f(x_1)$ are needed. The value $y=f(x)$ is required, where $x_0<x$ (1208)$<x_1$. In reverse linear interpolation example 1210, the sample point x1208 with basic value $y=f(x)$ is given and values $y_0=f(x_0)$ and $y_1=f(x_1)$ must be determined, where $x_0<x$ (1208)$<x_1$.

Returning to FIG. 11, step 1106, the reverse piecewise linear interpolation method uses the floating point coefficient extracted from geometric correction curve 1012 as the known sample value and splits off part of the floating point coefficient to obtain the surrounding two points. The first surrounding point is the nearest whole number below the floating point coefficient. The second surrounding point is the nearest whole number above the floating point coefficient. For example, a pixel number 17 has a corresponding floating point coefficient of 20.1 from geometric correction curve 1012. This coefficient remaps pixel 17 into pixel 20 and pixel 21. The grayscale values for pixels 20 and 21 are weighted using the grayscale value recorded for input pixel 17. Weighted amounts are based on the reflectivity of the light bars and the dark bars. For example, the reflectivity of the light bars might be ninety percent (90%) and the reflectivity of the dark bars might be ten percent (10%). Thus, 90% of the grayscale value of pixel 17 will go into pixel 20 because the absolute value of (20.1–20) is smaller than the absolute value of (20.1–21), and ten percent (10%) of the grayscale value of pixel 17 will go into pixel 21 because the absolute value of (20.1–21) is greater than the absolute value of (20.1–20). That is, pixel 20 is closer to coefficient 20.1 than pixel 21. Therefore, pixel 20 should have a larger grayscale value than pixel 21. This method of remapping using the piecewise linear interpolation method is repeated for each pixel. Grayscale values for each remapped pixel are then summed or accumulated. Control then passes to step 1108.

In step 1108, the grayscale values for each remapped pixel are stored in memory. These values are used to correct for geometric distortions when taking fingerprints. Control then passes to step 1110 where the process ends.

IV. Gray Level Linearity Calibration and Correction Procedure

Figure 13:
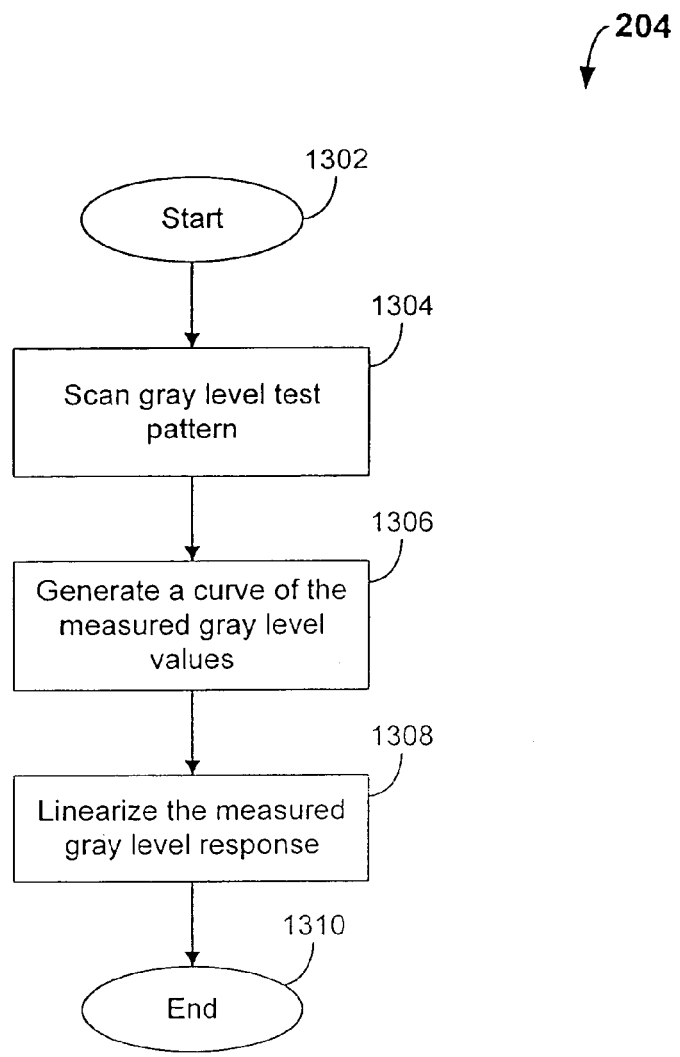
FIG. 13 is a flow diagram representing a method for a gray level linearity calibration and correction procedure.

FIG. 13 is a flow diagram representing a method for gray level linearity calibration and correction procedure 204. As previously stated, gray level linearity calibration and correction procedure 204 is performed at the factory or by a field engineer. In an alternative embodiment, gray level linearity calibration and correction procedure 204 may be performed by an operator periodically in a similar manner as auto-calibration procedure 202. Gray level linearity calibration and correction procedure 204 uses a gray level test pattern as its calibration target. The process begins with step 1302 where control immediately passes to step 1304.

In step 1304, a gray level test pattern is scanned multiple times into tenprint scanner 100 using fingerprint scanner 102. The multiple scans of the gray level test pattern are averaged to eliminate any noise. The averaged gray level test pattern is digitized to generate a digitized or measured gray level test pattern.

Figure 14:
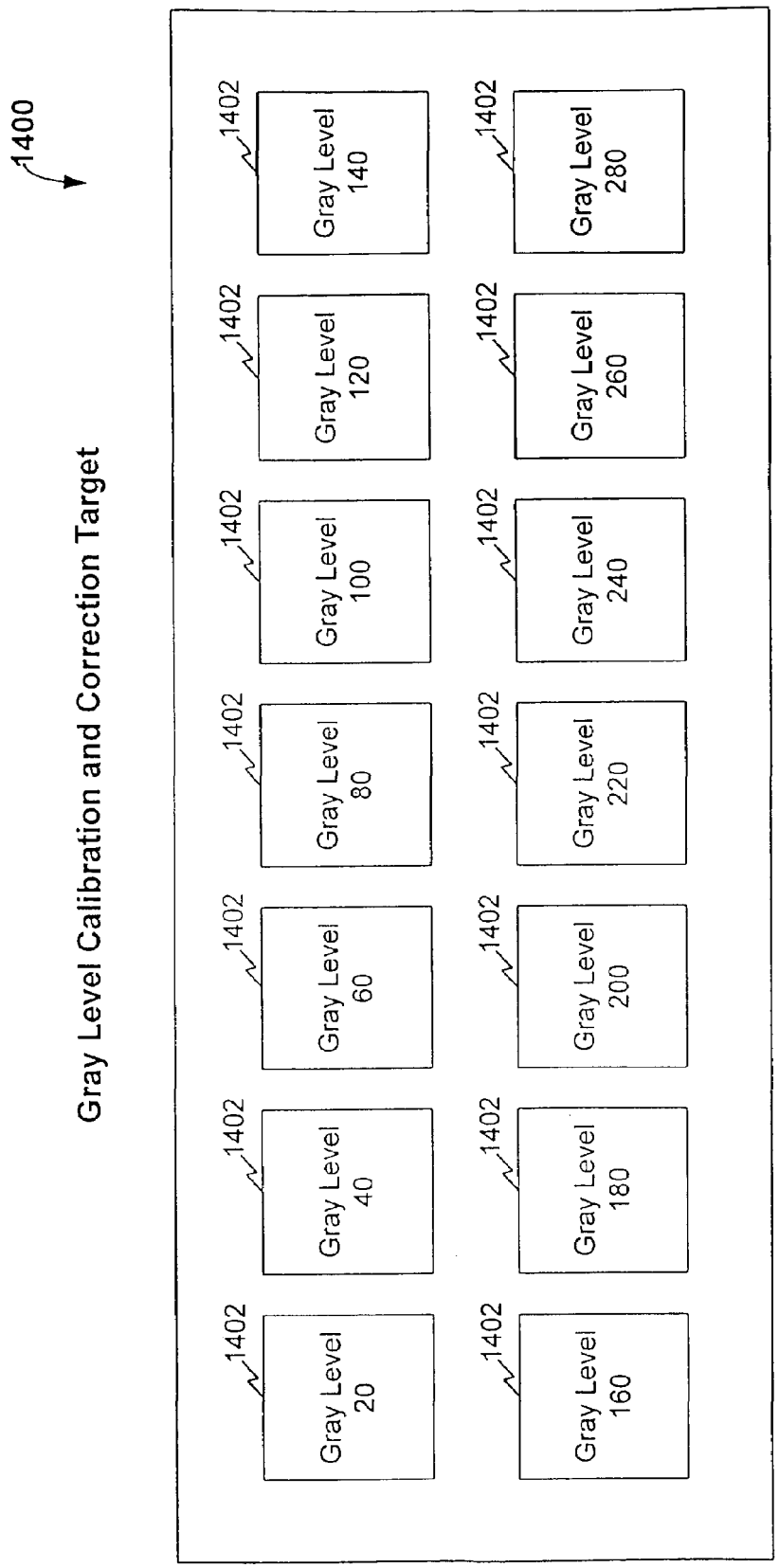
FIG. 14 is an exemplary gray level test pattern.

The gray level test pattern will now be described with reference to FIG. 14. FIG. 14 is an exemplary gray level test pattern. A gray level test pattern 1400 is comprised of fourteen gray level patches 402, each patch 402 of a known gray level value. Gray level patches 402 vary from dark gray to light gray.

Referring back to step 1304 in FIG. 13, after gray level test pattern 400 has been scanned and averaged, control then passes to step 1306.

Figure 15:
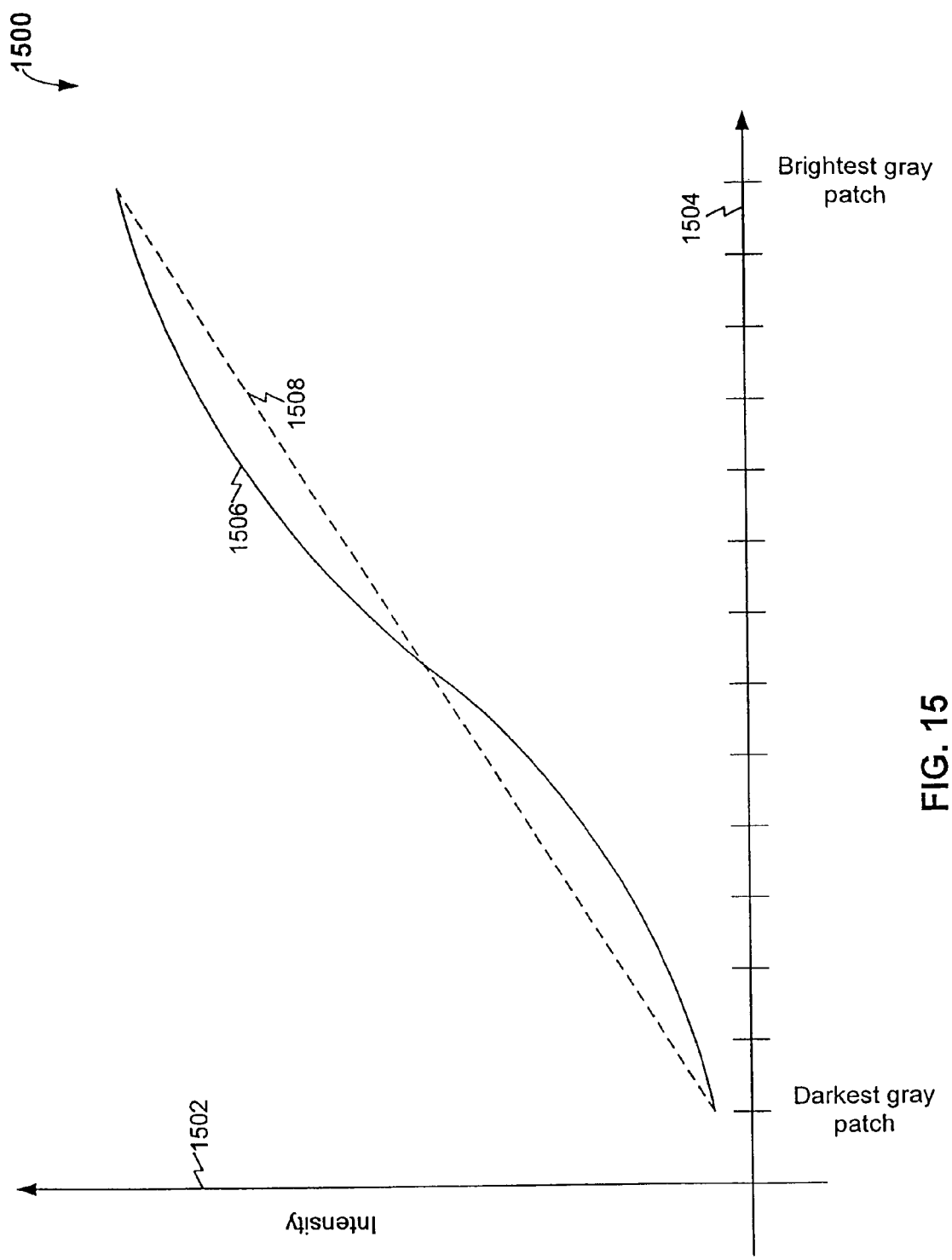
FIG. 15 is an exemplary curve of a digitized gray level test pattern.

In step 1306, a curve of the digitized gray level test pattern is generated. An exemplary curve of the digitized gray level test pattern is shown in FIG. 15. A graph 1500 is comprised of a y-axis 1502 of gray level intensity, an x-axis 1504 comprised of fourteen gray level values corresponding to gray level patches 1402, from the darkest gray level patch to the lightest or brightest gray level patch, and a plotted curve 1506 of an exemplary digitized or measured gray level test pattern. Plotted curve 1506 resembles an s-shaped curve. An actual curve 1508 of the true or actual gray level test pattern values is shown in phantom. Actual curve 1508 is a straight line.

Referring back to step 1306 in FIG. 13, once the curve of measured gray level values is generated, control then passes to step 1308. In step 1308, measured gray level test pattern curve 1506 is linearized. Linearization step 1308 is described in detail below with reference to FIG. 16. The linearized response is applied to the scanned fingerprint data when fingerprints are taken. Control then passes to step 1310 where the process ends.

Figure 16:
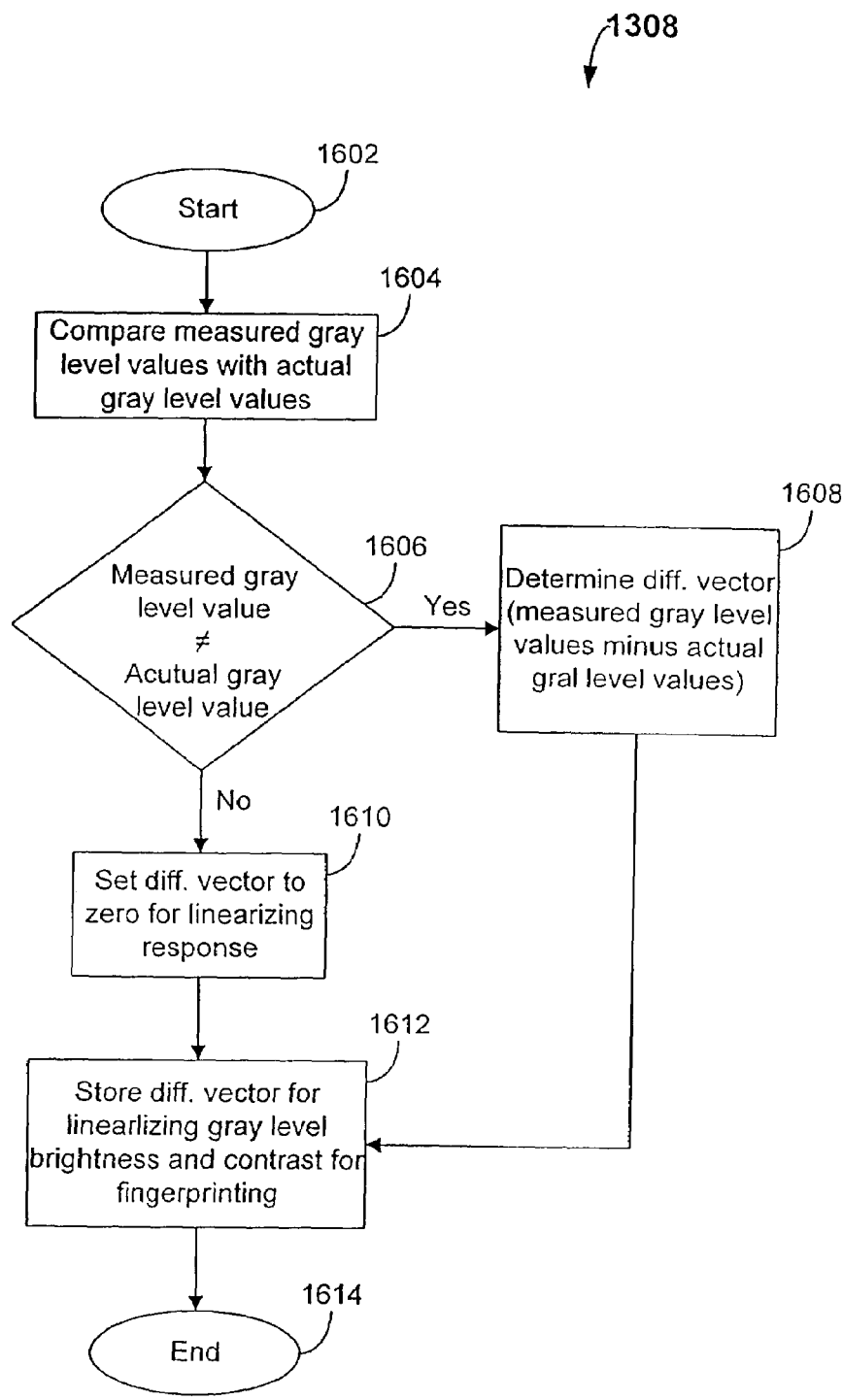
FIG. 16 is a flow diagram representing a linearization process of a gray level linearity calibration and correction procedure.

FIG. 16 is a flow diagram representing the linearization process 1308 of gray level linearity calibration and correction procedure 204. The process begins with step 1602 where control is immediately passed to step 1604.

In step 1604, measured gray level values are compared with actual gray level values using a look-up table. Control then passes to step 1606.

In step 1606, it is determined whether measured gray level values are equal to actual gray level values. If it is determined that the measured gray level values are not equal to the actual gray level values, control passes to step 1608.

In step 1608, a difference vector, or linearized response, equal to the difference between the measured values and the actual values is determined. Control then passes to step 1612.

Returning to decision step 1606, if it is determined that the measured values are equal to the actual gray level values, control passes to step 1610.

In step 1610, the difference vector is set to zero. Control then passes to step 1612.

In step 1612, the difference vector is stored in memory in order to linearize the gray level brightness and contrast during fingerprinting. Control then passes to step 1614 where the process ends.

V. Environment

Figure 17:
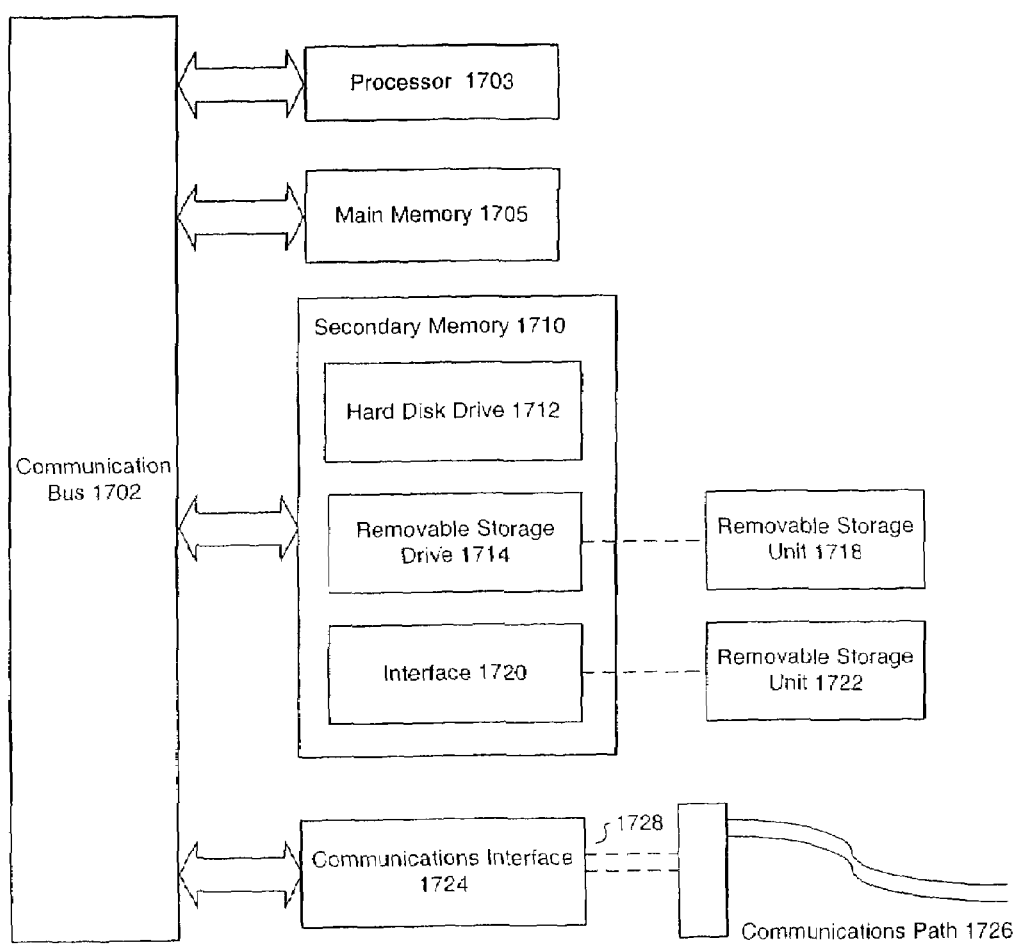
FIG. 17 is a diagram illustrating an exemplary computer system.

The present invention may be implemented using hardware, software, or a combination thereof and may be implemented in one or more computer systems or other processing systems. In fact, in one embodiment, the invention is directed toward one or more computer systems capable of carrying out the functionality described herein. An example of a computer system 1700 is shown in FIG. 17. The computer system 1700 includes one or more processors, such as processor 1703. The processor 1703 is connected to a communication bus 1702. Various software embodiments are described in terms of this exemplary computer system. After reading this description, it will be apparent to a person skilled in the relevant art how to implement the invention using other computer systems and/or computer architectures.

Computer system 1700 also includes a main memory 1705, preferably random access memory (RAM), and may also include a secondary memory 1710. The secondary memory 1710 may include, for example, a hard disk drive 1712 and/or a removable storage drive 1714, representing a floppy disk drive, a magnetic tape drive, an optical disk drive, etc. The removable storage drive 1714 reads from and/or writes to a removable storage unit 1718 in a well-known manner. Removable storage unit 1718, represents a floppy disk, magnetic tape, optical disk, etc., which is read by and written to by removable storage drive 1714. As will be appreciated, the removable storage unit 1718 includes a computer usable storage medium having stored therein computer software and/or data.

In alternative embodiments, secondary memory 1710 may include other similar means for allowing computer programs or other instructions to be loaded into computer system 1700. Such means may include, for example, a removable storage unit 1722 and an interface 1720. Examples of such may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a communications interface 1724. Communications interface 1724 allows software and data to be transferred between computer system 1700 and external devices. Examples of communications interface 1724 may include a modem, a network interface (such as an Ethernet card), a communications port, a PCMCIA slot and card, etc. Software and data transferred via communications interface 1724 are in the form of signals 1728 which may be electronic, electromagnetic, optical, or other signals capable of being received by communications interface 1724. These signals 1728 are provided to communications interface 1724 via a communications path (i.e., channel) 1726. This channel 1726 carries signals 1728 and may be implemented using wire or cable, fiber optics, a phone line, a cellular phone link, an RF link, and other communications channels.

In this document, the term A computer program product@ refers to removable storage units 1718, 1722, and signals 1728. These computer program products are means for providing software to computer system 1700. The invention is directed to such computer program products.

Computer programs (also called computer control logic) are stored in main memory 1705, and/or secondary memory 1710 and/or in computer program products. Computer programs may also be received via communications interface 1724. Such computer programs, when executed, enable the computer system 1700 to perform the features of the present invention as discussed herein. In particular, the computer programs, when executed, enable the processor 1703 to perform the features of the present invention. Accordingly, such computer programs represent controllers of the computer system 1700.

In an embodiment where the invention is implemented using software, the software may be stored in a computer program product and loaded into computer system 1700 using removable storage drive 1714, hard drive 1712 or communications interface 1724. The control logic (software), when executed by the processor 1703, causes the processor 1703 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

The present invention is not limited to the embodiment of fingerprint scanner 102. The present invention can be used with any biometric imaging system that scans a measurable characteristic of a human being for identity purposes. The previous description of the preferred embodiments is provided to enable any person skilled in the art to make or use the present invention. While the invention has been particularly shown and described with reference to preferred embodiments thereof, it will be understood by those skilled in the relevant art(s) that various changes in form and detail may be made therein without departing from the spirit and scope of the invention.

What is claimed is:

1. A method for calibration and correction of a fingerprint scanner system, comprising the steps of:
   (1) scanning a calibration target having brightness test information, focus test information, and geometric distortion test information using the fingerprint scanner system:
   (2) performing an auto-calibration procedure of the fingerprint scanner system using information from the scanned calibration target; and
   (3) performing a gray level linearity procedure for providing a linear brightness and contrast response when taking fingerprints.

2. The method of claim 1, wherein said step of performing said auto-calibration procedure comprises the step of performing said auto-calibration procedure on a daily basis or when requested by an operator.

3. The method of claim 1, wherein said step of performing said gray level linearity procedure comprises the step of performing said gray level linearity procedure at one of a factory, by a field technician at an on-site location, and by an operator at said on-site location.

4. The method of claim 1, wherein said step (2) comprises the steps of:
   (a) on a per-pixel basis, using bright and gray dark level values from the brightness test information to compute an equation of a line;
   (b) determining correction coefficients for each pixel for normalizing the response of all pixels; and
   (c) storing the results in memory.

5. The method of claim 4, wherein said step (1) comprises the steps of:
   (a) scanning said calibration target multiple times, resulting in multiple scans of said brightness test information; and
   (b) averaging the multiple scans of said brightness test information to eliminate noise.

6. The method of claim 4, wherein the brightness test information includes a bright strip and a dark strip, and wherein said step (2)(a) comprises the steps of:
   (i) plotting a dark gray level value versus reflectivity for said dark strip;
   (ii) plotting a bright gray level value versus reflectivity for said bright strip; and
   (iii) determining the equation of the line for the dark and bright gray level values using an equation, y=mx+b, wherein m is a slope and b is a y-intercept.

7. The method of claim 4, wherein said step (2)(b) comprises the steps of:
   (i) subtracting an offset value from a measured pixel value, wherein said offset value is a y-intercept value for the equation of the line; and
   (ii) multiplying the result of said step (2)(b)(i) by a gain value to obtain a corrected pixel value, wherein said gain value is 1/m, wherein m is a slope of the equation of the line.

8. The method of claim 7, wherein said step (2)(b)(ii) further comprises the step of multiplying the corrected pixel value by $\alpha$, wherein $\alpha$ is a multiplier for adjusting overall brightness.

9. The method of claim 7, further comprising the step of storing the offset and gain values in memory.

10. The method of claim 1, wherein said step (2) comprises the steps of:
    (a) generating a histogram of intensity versus gray level values from the focus test information; and
    (b) determining a quality factor Q for a bright peak in the histogram generated in said step (2)(a), wherein the quality factor Q is the ratio of a height to a width at half amplitude of the bright peak.

11. The method of claim 10, further comprising the steps of:
    (c) comparing the quality factor Q to a threshold value; and
    (d) generating an error message if the quality factor Q is less than the threshold value.

12. The method of claim 10, wherein said step (1) comprises the steps of:
    (a) scanning said calibration target multiple times, resulting in multiple scans of said focus test information; and
    (b) averaging the multiple scans of said focus test information to eliminate noise.

13. The method of claim 10, wherein said focus test information comprises n separate Ronchi rulings, each Ronchi ruling identifying different locations of a potential scan area or image area of the fingerprint scanner system, and wherein said step (1) comprises the step of scanning the n Ronchi rulings in said focus test information separately;

wherein said step (2)(a) comprises the step of generating n histograms, one for each of the n Ronchi rulings; and wherein said step (2)(b) comprises the step of determining the quality factor Q for each histogram for determining whether each location of the potential scan area is in focus.

14. The method of claim 1, wherein said step (2) comprises the steps of:
   (a) generating a geometric correction curve comprising a data point per pixel using the geometric distortion information from the scanned calibration target;
   (b) remapping each pixel using the geometric correction curve; and
   (c) generating an error message if data is out of bounds for correction.

15. The method of claim 14, wherein said step (1) comprises the steps of:
   (a) scanning said calibration target multiple times, resulting in multiple scans of said geometric distortion test information; and
   (b) averaging the multiple scans of said geometric distortion test information to eliminate noise.

16. The method of claim 14, wherein said step (2)(b) comprises the steps of:
   (i) determining a coefficient for each input pixel from the geometric correction curve;
   (ii) performing a reverse piecewise linear interpolation; and
   (iii) storing the results of said reverse piecewise linear interpolation in memory.

17. The method of claim 16, wherein said step (2)(b)(ii) comprises the steps of:
   (a) remapping said input pixel to first and second new pixel locations, wherein said first new pixel location is the nearest whole number below said coefficient, and wherein said second new pixel location is the nearest whole number above said coefficient;
   (b) determining maximum and minimum weighted grayscale values, wherein said maximum and minimum weighted grayscale values are based on said grayscale value of said input pixel weighted by first and second reflectivity values, wherein said first reflectivity value corresponds to a reflectivity value for a plurality of bright bars in said geometric distortion test information, and wherein said second reflectivity value corresponds to a reflectivity value for a plurality of dark bars in said geometric distortion test information;
   (c) placing said maximum weighted grayscale value in said first new pixel location and said minimum weighted grayscale value in said second new pixel location if the absolute value of said first new pixel location minus said coefficient is less than the absolute value of said second new pixel location minus said coefficient; and
   (d) placing said minimum weighted grayscale value in said first new pixel location and said maximum weighted grayscale value in said second new pixel location if the absolute value of said first new pixel location minus said coefficient is more than the absolute value of said second new pixel location minus said coefficient;
   (e) repeating steps (a) through (d) for all input pixels; and
   (f) summing grayscale levels for each remapped pixel.

18. The method of claim 1, wherein said step (3) comprises the steps of:
   (a) scanning a gray level test pattern;
   (b) generating a curve of measured gray level values; and
   (c) linearizing a measured gray level response.

19. The method of claim 18, wherein said step (3)(c) comprises the steps of:
   (i) comparing measured gray level values with actual gray level values;
   (ii) generating a difference vector, wherein said difference vector is the difference between the measured gray level values and the actual gray level values; and
   (iii) storing said difference vector in memory for providing said linear brightness and contrast response when taking fingerprints.

20. A method for calibration and correction of a fingerprint scanner system, comprising the steps of:
   (1) scanning a calibration target having brightness test information, focus test information, and geometric distortion test information using the fingerprint scanner system;
   (2) performing an auto-calibration procedure of the fingerprint scanner system, wherein said auto-calibration procedure comprises the steps of:
      (a) performing a brightness function to correct for distortions in brightness;
      (b) performing a focus check function to identify when the fingerprint scanner system is out of focus; and
      (c) performing a geometric distortion function to correct for imperfect linearity in the geometry of the fingerprint scanner system; and
   (3) performing a gray level linearity procedure for providing a linear brightness and contrast response when taking fingerprints.

21. A method for calibration and correction of a fingerprint scanner system, comprising the steps of:
   (1) scanning a calibration target having brightness test information, focus test information, and geometric distortion test information using the fingerprint scanner system; and
   (2) performing an auto-calibration procedure of the fingerprint scanner system, wherein said auto-calibration procedure comprises at least one of the steps of:
      (a) performing a brightness function to correct for distortions in brightness;
      (b) performing a focus check function to identify when the fingerprint scanner system is out of focus; and
      (c) performing a geometric distortion function to correct for imperfect linearity in the geometry of the fingerprint scanner system.

* * * * *